(12) United States Patent
Stan et al.

(10) Patent No.: US 12,101,252 B2
(45) Date of Patent: Sep. 24, 2024

(54) METHODS, SYSTEMS, AND COMPUTER READABLE MEDIA FOR IMPLEMENTING ROUTING PATH GROUPS BETWEEN EMULATED SWITCHES

(71) Applicant: Keysight Technologies, Inc., Santa Rosa, CA (US)

(72) Inventors: Razvan Ionut Stan, Agoura Hills, CA (US); Thomas Ameling, Woodland Hills, CA (US); Lyle Eugene Thompson, Mentone, CA (US); Diana Galan, Woodland Hills, CA (US); Russil Wvong, Vancouver (CA); Christian Paul Sommers, Bangor, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/896,057

(22) Filed: Aug. 25, 2022

(65) Prior Publication Data
US 2024/0073131 A1 Feb. 29, 2024

(51) Int. Cl.
*H04L 45/586* (2022.01)
*H04L 43/0882* (2022.01)
(Continued)

(52) U.S. Cl.
CPC ........ *H04L 45/586* (2013.01); *H04L 43/0882* (2013.01); *H04L 43/50* (2013.01); *H04L 45/42* (2013.01)

(58) Field of Classification Search
CPC ... H04L 45/586; H04L 43/0882; H04L 43/50; H04L 45/42
See application file for complete search history.

(56) References Cited

U.S. PATENT DOCUMENTS

| 4,726,017 A | 2/1988 | Krum et al. |
| 7,039,018 B2 | 5/2006 | Singh et al. |

(Continued)

FOREIGN PATENT DOCUMENTS

| EP | 2523401 A1 * | 11/2012 | ........... H04L 12/413 |
| EP | 1774726 B1 | 8/2013 | |

OTHER PUBLICATIONS

Pei Zheng and L. M. Ni, "Test and evaluation of wide area networks using emulator cluster," IEEE International Conference on Communications, 2003. ICC '03., Anchorage, AK, USA, 2003, pp. 281-285 vol.1, doi: 10.1109/ICC.2003.1204185. (Year: 2003).*

(Continued)

*Primary Examiner* — Rachel J Hackenberg

(57) ABSTRACT

One example method occurs in a test environment comprising network emulation platforms (NEPs), wherein the NEPs implement an emulated switching fabric comprising emulated switches, wherein the NEPs are connected via at least one physical cable. The method includes determining, using a network test system controller, at least one routing path group for communications between the emulated switches, wherein each of the at least one routing path group includes or uses virtual links utilizing one or more lanes of the at least one physical cable; configuring, using the network test system controller, physical ports of the NEPs to assign traffic during a test session to one of the virtual links based on a routing path group identifier associated with the traffic; and initiating, using the network test system controller, the test session involving the test environment.

17 Claims, 9 Drawing Sheets

(51) Int. Cl.
  *H04L 43/50* (2022.01)
  *H04L 45/42* (2022.01)

(56) References Cited

U.S. PATENT DOCUMENTS

| | | | |
|---|---|---|---|
| 8,223,767 B2 | 7/2012 | Nanda et al. | |
| 8,228,910 B2 | 7/2012 | Wu et al. | |
| 8,717,888 B2 | 5/2014 | Sankar et al. | |
| 8,780,896 B2 | 7/2014 | Mehra | |
| 8,885,493 B2 | 11/2014 | Sundaram et al. | |
| 9,401,872 B2 | 7/2016 | Vobbilisetty et al. | |
| 9,491,083 B2 | 11/2016 | Brolin et al. | |
| 9,537,785 B2 | 1/2017 | Bergeron | |
| 9,584,421 B2 | 2/2017 | Rai et al. | |
| 9,628,339 B1* | 4/2017 | Thai | H04L 67/10 |
| 10,666,541 B2 | 5/2020 | Gintis et al. | |
| 11,388,081 B1 | 7/2022 | Sommers et al. | |
| 11,405,302 B1 | 8/2022 | Liu et al. | |
| 11,483,227 B2 | 10/2022 | Sommers | |
| 11,483,228 B2 | 10/2022 | Llu et al. | |
| 11,729,087 B2 | 8/2023 | Bergeron et al. | |
| 2006/0002307 A1 | 1/2006 | Wang et al. | |
| 2006/0069544 A1* | 3/2006 | Liu | G06F 9/45537 703/27 |
| 2007/0195795 A1 | 8/2007 | Aral et al. | |
| 2007/0211640 A1 | 9/2007 | Palacharla et al. | |
| 2008/0291826 A1 | 11/2008 | Licardie et al. | |
| 2011/0069622 A1 | 3/2011 | Gintis et al. | |
| 2012/0051259 A1 | 3/2012 | Gintis et al. | |
| 2012/0051263 A1* | 3/2012 | Ozawa | H04L 41/12 370/254 |
| 2013/0094357 A1* | 4/2013 | Sankar | H04L 45/586 370/230 |
| 2014/0226457 A1 | 8/2014 | Hsueh et al. | |
| 2015/0023147 A1 | 1/2015 | Lee et al. | |
| 2015/0106669 A1 | 4/2015 | Gintis | |
| 2015/0156127 A1 | 6/2015 | Bello et al. | |
| 2016/0050156 A1 | 2/2016 | Bergeron | |
| 2016/0373362 A1* | 12/2016 | Cheng | H04L 47/24 |
| 2018/0011955 A1 | 1/2018 | Gintis | |
| 2018/0357108 A1* | 12/2018 | Mullender | G06F 9/45558 |
| 2020/0021510 A1 | 1/2020 | Gintis et al. | |
| 2020/0195553 A1 | 6/2020 | Yigit et al. | |
| 2022/0247661 A1 | 8/2022 | Liu et al. | |
| 2022/0253324 A1 | 8/2022 | Liu et al. | |
| 2023/0171177 A9 | 6/2023 | Liu et al. | |

OTHER PUBLICATIONS

J. C. Sancho, J. Flich, A. Robles, P. Lopez and J. Duato, "Analyzing the influence of virtual lanes on the performance of infiniband networks," Proceedings 16th International Parallel and Distributed Processing Symposium, Ft. Lauderdale, FL, USA, 2002, pp. 10 pp—, doi: 10.1109/IPDPS.2002.1016568. (Year: 2002).*

H. Moraes, M. A. M. Vieira, Í. Cunha and D. Guedes, "Efficient virtual network isolation in multi-tenant data centers on commodity ethernet switches," 2016 IFIP Networking Conference (IFIP Networking) and Workshops, Vienna, Austria, 2016, pp. 100-108, doi: 10.1109/IFIPNetworking.2016.7497251. (Year: 2016).*

"Network Traffic Manipulation and Visualization Via Digital Audio Workstation (DAW) Paradigm", IP.com, Pub. Id. IPCOM000267303D (Oct. 2021).

Commonly-Assigned, co-pending U.S. Appl. No. 17/498,723 for "Methods, Systems, and Computer Readable Media for Recycling Background Traffic in a Test Environment" (Unpublished, filed Oct. 11, 2021).

"Systems and Methods For Demonstrating Network Visibility Tool Performance", IP.com, Pub. Id. IPCOM000267564D (Nov. 2021).

"Systems and Methods for Emulating Link Flapping in a Datacenter Fabric", IP.com, Pub. Id., IPCOM000267776D (Dec. 2021).

"Datacenter Emulator as a SmartNIC/DASH Test Platform", IP.com, Pub. Id. IPCOM000269877D (Jun. 2022).

"Systems And Methods For Testing And Analyzing TCP Behavior In A Data Center", IP.com, Pub. Id., IPCOM000270660D (Aug. 2022).

"Systems and Methods For Testing and Analyzing TCP Behavior Via SmartNIC Offloading", IP.com, Pub. Id. IPCOM000270659D (Aug. 2022).

Commonly-Assigned, co-pending U.S. Appl. No. 17/860,932 for "Methods, Systems, and Computer Readable Media for Capturing Dropped Packets at a Switching Fabric Emulator", (Unpublished, filed Jul. 8, 2022).

"Systems And Methods For Providing Concurrent Switch Fabric Emulations On A Single Hardware Device", IP.com, Pub Id. IPCOM000270216D (Jun. 2022).

Commonly-Assigned, co-pending U.S. Appl. No. 17/841,629 for "Methods, Systems, and Computer Readable Media for Processing Control Plane Messages for Emulated Data Center Switching Fabric" (Unpublished, filed Jun. 15, 2022).

Notice of Allowance and Fee(s) Due and Examiner-Initiated Interview Summary for U.S. Appl. Serial No. 16/033,144 (dated Jan. 21, 2020).

Non-Final Office Action for U.S. Appl. No. 16/033,144 (dated Sep. 25, 2019).

Commonly-Assigned, co-pending U.S. Appl. No. 16/033,144 for "Methods, Systems, And Computer Readable Media For Link Aggregation Group Switchover In A Network Testing Environment," (Unpublished, filed Jul. 11, 2018).

Notice of Allowance and Fee(s) Due and Examiner-Initiated Interview Summary for U.S. Appl. No. 14/460,340 (dated Aug. 26, 2016).

Applicant-Initiated Interview Summary for U.S. Appl. No. 14/460,340 (dated Jun. 17, 2016).

Non-Final Office Action for U.S. Appl. No. 14/460,340 (dated Mar. 21, 2016).

Krishnan, "Flow-aware Real-time SDN Analytics (FRSA)," http://blog.sflow.com/2014/02/flow-aware-real-time-sdn-analytics-frsa.html, pp. 1-12 (Feb. 5, 2014).

"Traffic Generator Upgrade", CGS Tower Networks LTD, pp. 1-11 (2023).

Search Report for GB Patent Application Serial No. 2312755.8 (Feb. 13, 2024).

"Systems and Methods For Providing Flexible Replay Of A Network Test", IP.com, Pub. Id. IPCOM000270215D (Jun. 2022).

Office Action for Chinese Patent Application Serial No. 201910621331.X (Feb. 9, 2024).

* cited by examiner

500

| TID | NEP ID | EMUL SW ID | LOGICAL PORT | PHYS SW ID | PHYS PORT |
|---|---|---|---|---|---|
| TOP_1 | NEP1 | TORSW1 | 3 | SW1 | 1 |
| TOP_1 | NEP1 | TORSW1 | 4 | SW1 | 1 |
| TOP_1 | NEP1 | TORSW1 | 5 | SW1 | 1 |
| TOP_1 | NEP2 | TORSW3 | 3 | SW3 | 14 |
| TOP_1 | NEP2 | TORSW3 | 4 | SW2 | 2 |
| TOP_1 | NEP2 | TORSW3 | 5 | SW3 | 14 |
| ... | ... | ... | ... | ... | ... |
| TOP_4 | NEP2 | TORSW3 | 4 | SW2 | 2 |
| TOP_4 | NEP2 | TORSW4 | 8 | SW3 | 14 |
| TOP_4 | NEP3 | TORSW4 | 3 | SW4 | 9 |
| TOP_4 | NEP3 | TORSW4 | 5 | SW4 | 1 |

| HASH VALUE / PATH ID | ROUTING PATH GROUP | NEXT HOP LOGICAL PORT | NEXT HOP PHYSICAL PORT | METADATA |
|---|---|---|---|---|
| 0 | A | SPSW:40 | NEP3:4 | CABLE 1, LANE 1 |
| 1 | A | SPSW:41 | NEP3:4 | CABLE 1, LANE 2 |
| 2 | B | SPSW:42 | NEP3:4 | CABLE 1, LANE 3 |
| 3 | B | SPSW:43 | NEP3:4 | CABLE 1, LANE 4 |
| 4 | B | SPSW:44 | NEP3:4 | CABLE 1, LANE 5 |
| 5 | B | SPSW:45 | NEP3:4 | CABLE 1, LANE 6 |
| 6 | A | SPSW:46 | NEP3:4 | CABLE 1, LANE 7 |
| 7 | A | SPSW:47 | NEP3:4 | CABLE 1, LANE 7 |

FIG. 6

METHODS, SYSTEMS, AND COMPUTER READABLE MEDIA FOR IMPLEMENTING ROUTING PATH GROUPS BETWEEN EMULATED SWITCHES

TECHNICAL FIELD

The subject matter described herein relates to network testing. More specifically, the subject matter relates to methods, systems, and computer readable media for implementing routing path groups between emulated switches.

BACKGROUND

Data center environments typically provide high reliability and security and typically include networked resources (e.g., virtual or physical servers connected via network switches) sharable by multiple clients of the data center operator. Large data centers are industrial scale operations using as much electricity as a small town. Various data centers may utilize virtualization. For example, a data center may implement multiple virtual machines (VMs) that communicate via a virtual switch (vSwitch), e.g., virtual servers, using a physical central processing unit (CPU)-based server or node in the data center. In this example, each VM may execute an operating system and other software, where each VM may appear as a physical server to end users.

When testing data center equipment and/or network equipment, it is important to make sure that testing mimics real world scenarios and conditions. For example, when testing a data center server or related applications, it may be necessary to mimic or emulate a switching fabric or other resources in the data center and to emulate or approximate various test scenarios or related processing states, e.g., by using test traffic and/or effecting various processing scenarios.

SUMMARY

Methods, systems, and computer readable media for implementing routing path groups between emulated switches are disclosed. One example method occurs in a test environment comprising network emulation platforms (NEPs), wherein the NEPs implement an emulated switching fabric comprising emulated switches, wherein the NEPs are connected via at least one physical cable. The method includes determining, using a network test system controller, at least one routing path group for communications between the emulated switches, wherein each of the at least one routing path group includes or uses virtual links utilizing one or more lanes of the at least one physical cable; configuring, using the network test system controller, physical ports of the NEPs to assign traffic during a test session to one of the virtual links based on a routing path group identifier associated with the traffic; and initiating, using the network test system controller, the test session involving the test environment.

According to one example system, the system includes a test environment comprising NEPs, wherein the NEPs implement an emulated switching fabric comprising emulated switches, wherein the NEPs are connected via at least one physical cable; and a network test system controller configured for: determining at least one routing path group for communications between the emulated switches, wherein each of the at least one routing path group includes or uses virtual links utilizing one or more lanes of the at least one physical cable; configuring physical ports of the NEPs to assign traffic during a test session to one of the virtual links based on a routing path group identifier associated with the traffic; and initiating the test session involving the test environment.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' may refer to a physical computer platform including one or more processors, one or more network interfaces, and memory.

As used herein, the term 'switch' may refer to a packet forwarding element, including, for example, a network switch, a network router, or a combination thereof.

As used herein, each of the terms 'function', 'engine', and 'module' may refer to hardware, which may also include software and/or firmware, for implementing the feature(s) being described.

BRIEF DESCRIPTION OF THE DRAWINGS

The subject matter described herein will now be explained with reference to the accompanying drawings of which:

FIG. 5 is a diagram illustrating example port mapping data;

FIG. 6 is a diagram illustrating example forwarding data;

DETAILED DESCRIPTION

Figure 1:
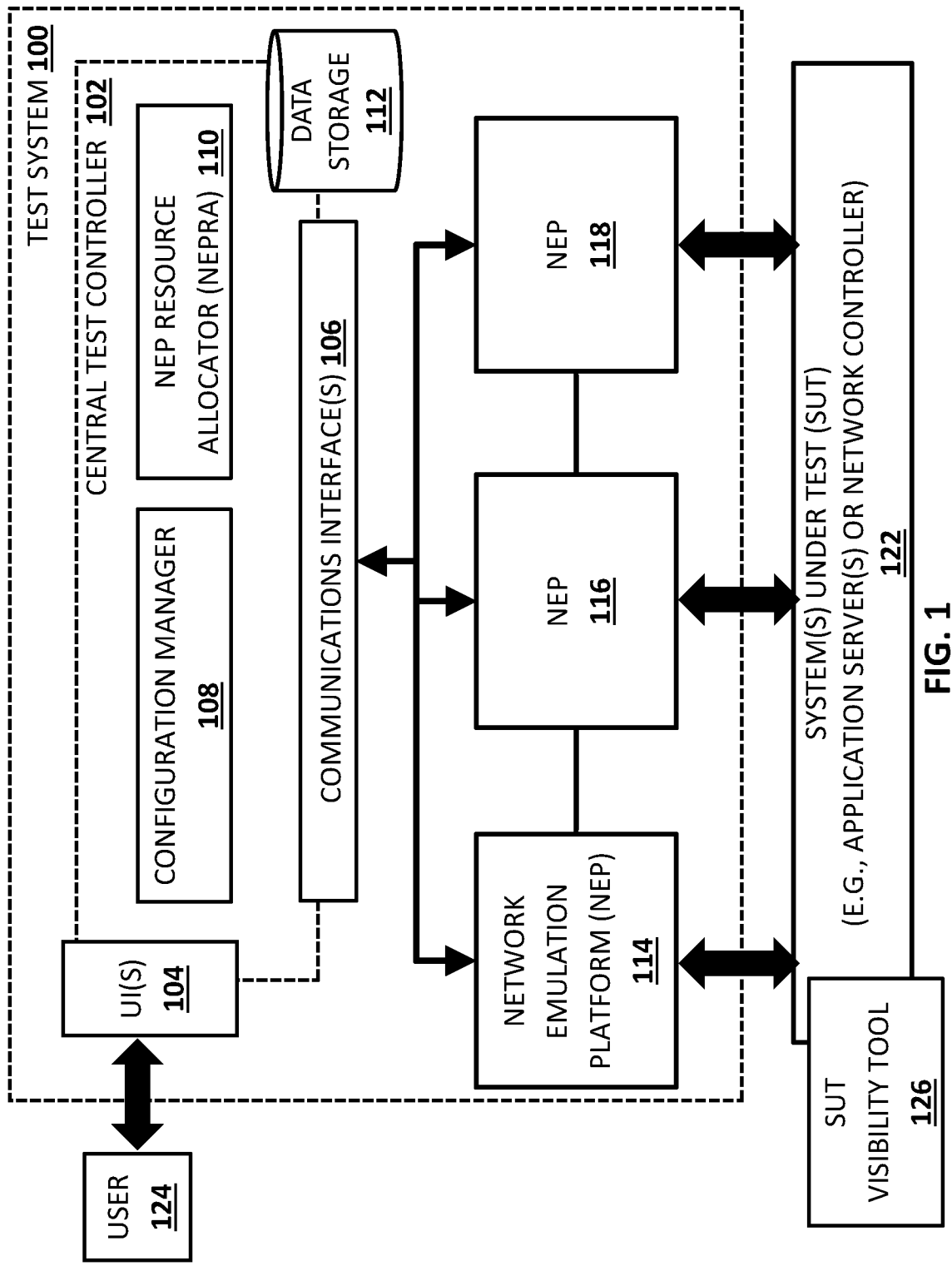
FIG. 1 is a diagram illustrating an example test system for network testing.

The subject matter described herein includes methods, systems, and computer readable media for implementing routing path groups between emulated switches. When testing equipment for use in large-scale networks or data centers, test environments may need to emulate a switching fabric that include multiple switches (e.g., network switches, network routers, or other packet forwarding devices). While an emulation platform (e.g., a network emulation platform or a switching fabric emulator) can emulate multiple switches, it may be necessary to utilize multiple emulation platforms to emulate some large-scale or complex switching fabrics. As such, a test system that can utilize an emulated switching fabric comprising multiple emulation platforms can be useful in testing how a network product or service performs at scale in a particular switching fabric environment (e.g., a data center environment) and/or for testing how a network product or service will impact the performance of a particular switching fabric environment or a device associated with that particular switching fabric environment.

In accordance with some aspects of the subject matter described herein, an emulated switch is distinctly different from an entity referred to commonly in the industry as a virtual switch. More particularly, a virtual switch (vSwitch) is a software application that runs on top of a CPU, which allows communication between virtual machines, where the virtual machines are administered by a virtual machine hypervisor. A vSwitch does not subdivide and allocate resources of an underlying physical switch (e.g., a fixed-function or programmable (e.g., using languages such as P4, NPL, etc.) ASIC or a system on a chip (SoC)) into multiple emulated switches, but instead creates a software representation of a completely virtual switch and there is no mapping to underlying physical switching ASIC or chip hardware resources.

In accordance with some aspects of the subject matter described herein, a test system (e.g., one or more computing platforms, devices, or nodes) may be configured to emulate a switching fabric environment (e.g., a data center environment), such as virtual networking resources and/or other switching fabric related resources. In accordance with some aspects of the subject matter described herein, a switching fabric emulator may be implemented using one or more network emulation platforms (NEPs) (e.g., chassis or nodes with one or more physical switching application-specific integrated circuit (ASIC) resources usable for emulating a number of switches connected via various topologies). It will be appreciated that some embodiments include one or more emulated switches, where an emulated switch is a logically allocated portion of a physical switching ASIC of a NEP that appears as an independent logical switch device to the environment (e.g., a DUT, SUT, or controller) by using a NEP resource allocator (NEPRA) and/or a switching ASIC resource allocator (SARA). In some embodiments, the NEPRA and/or SARA may be configured to facilitate collection and reporting of emulated logical switch performance metric information (e.g., emulated logical switch packet queue depth, emulated logical switch latency, etc.) during a test run or session by a visibility module.

In accordance with some aspects of the subject matter described herein, when emulating a switching fabric or infrastructure including multiple network emulation devices (NEPs) (e.g., switching fabric emulators) that provided emulated elements for testing a SUT, traffic may need to travel between the NEPs during a test session, e.g., when test traffic traverses emulated elements provided by different NEPs. While the emulated switching fabric may appear as a large-scale network or data center fabric with numerous virtual links, the NEPs may actually be connected via one or more physical cables (e.g., a 400 gigabits per second (400G) or 200G Ethernet cable).

In accordance with some aspects of the subject matter described herein, a test system can configure one or more network emulation devices (e.g., switching fabric emulators) or related entities to virtualize physical links and/or related physical ports. In some embodiments, each network emulation device may include a port virtualizer module (e.g., software executing on network cards or a processor) for configuring a physical port to act as independent logical ports (e.g., virtual ports). For example, a port virtualizer module may virtualize a 400G physical port into four independent 100G logical ports. In this example, each logical port may communicate traffic via one or more virtual links, where a virtual link may comprise or use one or more lanes (e.g., physical-layer lanes) of a physical cable connected to the 400G port.

In accordance with some aspects of the subject matter described herein, a test system can configure one or more NEPs for implementing routing path groups (e.g., load balancing groups (e.g., groups for load balancing traffic via one or more techniques, such as random, round-robin, spray mode, etc.), equal-cost multipath (ECMP) groups, weighted ECMP groups, spray mode groups, or link aggregate groups (LAGs)) between emulated elements (e.g., emulated switches or routers) provided by the NEPs using multiple virtual links (e.g., supported by a single physical cable). In some embodiments, multi-device routing path group configuration may be transparent for the user, and consequently easier for them to setup and administer. For example, assuming a 400G physical port is virtualized into four 100G logical ports, the logical ports may act independently by utilizing separate or distinct lanes of a physical cable (connected to the 400G physical port) and some or all of these virtual 100G ports may be assigned to or associated with an ECMP group. In this example, assuming the physical cable include four distinct lanes, a first ECMP group may be associated with the logical ports or virtual links involving two distinct lanes and a second ECMP group may be associated with the logical ports or virtual links involving the other two distinct lanes.

By implementing routing path groups between emulated switches utilizing one or more physical cables, an example test system can benefit from various advantages including, but not limited to, enabling a test system or an analyzer thereof to emulate various traffic forwarding or routing scenarios in an emulated switching fabric of a test environment. For example, a test system or a related test controller can send configuration information to multiple NEPs (e.g., devices or platforms comprising at least one fixed-function or programmable ASIC or SoC) that can subdivide or allocate physical resources to implement or provide emulated switching elements) for providing an emulated switching fabric that includes multiple emulated elements, where traffic between the emulated elements can be routed or forwarded via logical ports or links supported by or implemented via at least one physical cable.

It will be appreciated that some aspects of the subject matter described herein may be utilized for various test environments including embodiments that involve emulated switching fabric elements (e.g., data center switches, routers, etc.), as well as embodiments that utilize real/physical switching fabric elements. It will be appreciated that other embodiments not shown herein may include test environments or scenarios that involve a combination of both emulated and real or physical data center architectures.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a diagram illustrating an example test system 100 for network testing. Test system 100 may represent any suitable entity or entities (e.g., one or more computing platforms, nodes, or devices) associated with testing SUT 122 (e.g., one or more application servers, a network controller, or a network management system). For example, test system 100 may include a central test controller (CTC) 102 for allowing a user 124 (e.g., a human operator or another entity) to configure or select a testing scenario (e.g., using predefined and/or user-defined templates), for generating and sending test traffic to SUT 122, for receiving response traffic from SUT 122, for configuring an emulated switching fabric that utilize routing path groups (e.g., load balancing groups, ECMP groups, weighted ECMP groups, or LAGs) between emulated switches (or other elements), and/or for analyzing one or more test results, e.g., routing issues and/or performance aspects associated with SUT 122.

In some embodiments, test system 100 may include test configuration software, one or more network equipment test devices or platforms, network emulation platforms (NEPs), visibility tools or modules (e.g., physical or virtual network taps), and/or test related software executing on one or more processor(s).

In some embodiments, test system 100 may include one or more modules for performing various test related functions. For example, test system 100 may include a traffic engine or traffic generator for generating test traffic and/or may include various testing related applications or devices (e.g., a test analyzer or test configuration manager) for testing SUT 122. In this example, test system 100 may also include a central test controller (CTC) 102 for triggering and/or managing one or more test sessions associated with one or more NEPs 114-118 or a related emulated environment.

In some embodiments, test system 100 or aspects thereof may be controlled or defined using one or more user-definable data models. For example, test system 100 may allow user 124 to configure or modify a resource allocator model, a switching model, a data center emulation or switching topology model, a traffic generator model, a network visibility model, etc. In this example, high-level or user-definable data models may be converted into lower-level data models or into computer readable instructions for implementing an emulated switching fabric environment using the user-definable data models and resources in one or more of NEPs 114-118.

SUT 122 may be any suitable entity or entities (e.g., devices, systems, or platforms) for receiving, processing, forwarding, and/or sending one or more messages (e.g., packets). In some embodiments, SUT 122 may include one or more logical or physical partitions. For example, SUT 122 may include a network node, a network switch, a network router, a network interface card, a packet forwarding device, or one or more virtual network functions (VNF). In this example, SUT 122 or a VNF thereof may be software in a virtual container (VC) or machine (VM) executing on shared resources (e.g., compute, storage, and network resources in a cloud computing environment). In some embodiments, nodes or a VNF of SUT 122 may include processing logic (e.g., rules associated with packet forwarding/processing) that is independent or separate from another portion of SUT 122 or another VNF.

SUT visibility tool 126 may be any suitable entity or entities (e.g., software executing on a processor, an ASIC, an FPGA, or a combination of software, an ASIC, or an FPGA) for monitoring, obtaining, and/or providing SUT performance or related visibility information (e.g., using virtual or physical probes or network taps). For example, SUT visibility tool 126 may include an application programming interface (API) based server or interface that provides collected SUT performance metrics or other related information to test system 100, CTC 102, packet analyzers, visibility modules, or other entities. In this example, SUT visibility tool 126 may obtain various SUT performance related data from one or more visibility related devices, applications, or nodes within or around SUT 122. Continuing with this example, SUT visibility tool 126 may generate performance reports or test analysis reports associated with SUT 122 and may send the reports to test system 100 or entities therein for analysis or other purposes. In another example, SUT visibility tool 126 may be a system with one or more processors (e.g., central processor units (CPUs)) for capturing packets and/or analyzing traffic or related performance, e.g., offline (e.g., after testing session) or online (e.g., during testing session).

Test system 100 may include CTC 102 and multiple NEPs, e.g., NEPs 114-118. CTC 102 may be any suitable entity or entities (e.g., software executing on a processor, a field-programmable gateway array (FPGA), and/or an ASIC, or a combination of software, an FPGA, and/or an ASIC) for performing one or more aspects associated with configuring a test environment or a related testing scenario. In some embodiments, CTC 102 may be implemented using one or more processors and/or memory and may be a single device or node or may be distributed across multiple devices or nodes, e.g., cloud-based. For example, CTC 102 may act as a centralized, cloud-based entity for receiving user input related to setting up a testing scenario involving an emulated switching fabric environment via one or more UI(s) 104 and may use the user input for configuring NEPs 114-118 or other test system entities for the testing scenario. In this example, CTC 102 may send sets of configuration instructions to various modules or entities, e.g., one or more NEPs 114-118 for setting up or configuring an emulated switching fabric environment.

In some embodiments, CTC 102 may include a configuration manager (CM) 108. CM 108 may be any suitable entity or entities (e.g., software executing on a processor, an FPGA, and/or an ASIC, or a combination of software, an FPGA, and/or an ASIC) for performing one or more aspects associated with interfacing with user 124 and/or providing access to various test related services. In some embodiments, CM 108 may include an application programming interface (API) server or gateway and may be usable for providing one or more of UI(s) 104. For example, UI(s) 104 can be usable for provisioning test system 100, controlling test execution, and accessing or viewing test result information including emulated switching fabric environment performance information. In this example, user 124 may communicate with an API server or other test system entity via an external API that is implemented using a remote procedure call (RPC) protocol.

In some embodiments, CM 108 (or a related API server or gateway) may provide access to several test related services (e.g., traffic generation, visibility and switching fabric emulation, chassis resource, test session generation) with which the user can interact, provision, or control. For example, via one or more APIs or UI(s) 104 associated with CM 108, user 124 can provide test traffic generation requirements for a test session; provide or request test result performance metrics; provide data center or switching fabric emulation requirements or configurations; provide which of NEPs 114-118 or related resources are available for use in a test session; and/or provide test session definitions and associated configuration parameters.

In some embodiments, CTC 102, CM 108, and/or related entities may include or utilize one or more UI(s) 104 for receiving settings and/or configuration information for setting up a testing scenario or a related test session. For example, UI(s) 104 may include any interface usable by one or more types of user 124 (e.g., a human or another entity like an application, a machine, or a device) to interact with test system 100 or related entities. In some embodiments, one or more of UI(s) 104 may support automation e.g., via one or more programming languages (e.g., python), a REST API, an RPC API (e.g., a gRPC API), a command line interface (CLI), a machine-to-machine (M2M) automation interface, and/or a web based GUI.

In some embodiments, UI(s) 104 may include or utilize a GUI or other user interface for selecting and/or configuring emulated switching fabric environments and/or other related settings (e.g., test reporting and/or network visibility settings). For example, CTC 102 and/or CM 108 may provide a web based GUI for obtaining a test operator or another entity's intent for setting up or configuring testing scenarios and/or related emulated switching fabric environments. In this example, the web based GUI may be usable for visually defining a data center switching topology comprising one or more emulated switches and/or to indicate particular physical resources to allocate to each emulated switch. In another example, the web based GUI may be usable for gathering test session settings and/or for providing cabling instructions for interconnecting NEPs 114-118 or other entities associated with a test session or test system 100.

In some embodiments, CTC 102, CM 108, and/or related entities may include or utilize software (e.g., a distributed control and orchestration layer or a related API) that provides one or more interfaces for communicating with various test system entities (e.g., emulated and physical switches) for providing monitoring rules and/or related forwarding and/or routing rules of an emulated switching fabric environment.

In some embodiments, CTC 102, CM 108, and/or related entities may configure one or more of NEPs 114-118 to act as a switching fabric emulator. In such embodiments, the switching fabric emulator may be configured to provide emulated switches, e.g., by allocating a subset of resources from underlying ASIC or programmable chips to implement each emulated switch and packet queue.

In some embodiments, two or more NEPs 114-118 may be connected via a physical cable between respective physical ports, where the physical cable is of a given capacity or bandwidth (e.g., a 400G Ethernet cable). In such embodiments, each physical port may be configured to function as multiple, independent logical ports, where each logical port may use a virtual link comprising or utilizing a lane (e.g., a physical-layer lane) of the physical cable. For example, a 400G Ethernet cable may be divided into four virtual links, where each virtual link utilizes a different lane of the physical cable and an equal portion of the total capacity (e.g., each of the four virtual links has a 100G capacity). In another example, a 400G Ethernet cable may be divided into eight virtual links, where each virtual link utilizes a different lane of the physical cable and a equal portion of the total capacity (e.g., each of the eight virtual links has a 50G capacity).

In some embodiments, one or more of NEPs 114-118 may include functionality for configuring and implementing routing path groups (e.g., load balancing groups, ECMP groups, weighted ECMP groups, or LAGs) between emulated elements provided by NEPs 114-118 using multiple virtual links (e.g., supported by a single physical cable). In some embodiments, multi-device routing path group configuration may be transparent for the user, and consequently easier for them to setup and administer. For example, each of NEPs 114 and 116 may include a port virtualizer module or related functionality for allowing, for example, a 400G port to be virtualized into four 100G logical ports or links. In this example, the logical ports may act independently by utilizing separate or distinct lanes of a physical cable and some or all of these virtual 100G ports or links may be configured to be members of an ECMP group associated with emulated elements implemented by NEPs 114 and 116, where NEPs 114 and 116 are connected by a physical cable.

In some embodiments, a switching fabric emulator (e.g., one or more of NEPs 114-118) may be configured to implement routing path groups between emulated switches (and/or other elements) provided by one or more of NEPs 114-118. For example, a first physical cable (e.g., a 400G Ethernet cable) may connect NEP 114 and NEP 116, a second physical cable (e.g., 400G Ethernet cable) may connect NEP 114 and NEP 118, and a third physical cable (e.g., 200G Ethernet cable) may connect NEP 116 and NEP 118. In this example, the switching fabric emulator or entities therein may virtualize each physical link into multiple virtual links (e.g., indicative of physical-layer lanes of the physical cable) and assign one or more of the virtual links to a particular routing path group. Continuing with this example, assuming the first physical cable is virtualized into four virtual links (e.g., if the first physical cable is 400G, then each of the four virtual links may be 100G) and each ECMP group is uniquely associated with one of the four virtual links, traffic associated with a first ECMP group may be routed via a virtual link 'A' of the first physical cable, traffic associated with a second ECMP group may be routed via a virtual link 'B' of the first physical cable, traffic associated with a third ECMP group may be routed via a virtual link 'C' of the first physical cable, and traffic associated with a fourth ECMP group may be routed via a virtual link 'D' of the first physical cable. Further, in this example, assuming the second physical cable is virtualized into eight virtual links (e.g., if the first physical cable is 400G, then each of the eight virtual links may be 50G) and each ECMP group is uniquely associated with two of the eight virtual links, traffic associated with the first ECMP group may be routed via virtual links 'A' and 'C' of the second physical cable, traffic associated with the second ECMP group may be routed via virtual links 'B' and 'D' of the second physical cable, traffic associated with the third ECMP group may be routed via a virtual link 'E' of the second physical cable, and traffic associated with a fourth ECMP group may be routed via virtual links 'F', 'G', and 'H' of the second physical cable. Furthermore, in this example, assuming the third physical cable is virtualized into four virtual links (e.g., if the first physical cable is 200G, then each of the four virtual links may be 50G) and each ECMP group is uniquely associated with one of the four virtual links, traffic associated with the first ECMP group may be routed via a virtual link 'A' of the third physical cable, traffic associated with the second ECMP group may be routed via a virtual link 'B' of the third physical cable, traffic associated with the third ECMP group may be routed via a virtual link 'C' of the third physical cable, and traffic associated with a fourth ECMP group may be routed via a virtual link 'D' of the third physical cable.

In some embodiments, routing path groups between emulated switches may be implemented using one or more breakout cables (e.g., a fanout cable with one connector on one side and multiple connectors on the opposite side). For example, a 400G port of NEP 114 may be physically cabled to four other NEPs using a breakout cable, where each connection utilizes two lanes (e.g., each lane having a 50G capacity). In this example, a first routing path group (e.g., a load balancing group 'A') may be associated with a first lane of each connection and a second routing path group (e.g., a load balancing group 'B') may be associated with a second lane of each connection.

In some embodiments, routing path group configurations may be flexible and/or dynamic. For example, a test system may configure distinct ECMP configurations for different test sessions. In some embodiments, some ECMP groups may share a physical cable or an ECMP group may span across lanes of multiple physical cables. In some embodiments, some lanes of a physical cable may be used for traffic between a first set of emulated switches, while other lanes of the same physical cable may be used for traffic between a second set of emulated switches.

In some embodiments, e.g., during or after a test session, a packet analyzer or other entity may receive and use packet information for various purposes, e.g., generating reports and/or visualizations. For example, after receiving packet information from a switch fabric emulator or related entity, a packet analyzer may use the information in generating a visual map or a report indicating traffic attributes or other information (e.g., metrics associated with emulated switches or related packet queues) in an emulated switching fabric.

In some embodiments, CTC 102, CM 108, and/or related entities may include or interact with one or more analysis and/or visibility modules (e.g., SUT visibility tool 126 and/or NEP visibility modules) for obtaining and processing performance metrics or related information (e.g., external or internal event data). In some embodiments, obtained performance metrics or related information may be used in dynamically adjusting an amount of test traffic in an emulated switching fabric or a particular fabric entity and/or adjusting or maintaining a queue depth (e.g., an egress packet queue) at one or more fabric entities (e.g., an emulated or real network switch).

In some embodiments, CTC 102, CM 108, and/or related entities may communicate or interact with a NEP resource allocator (NEPRA) 110. NEPRA 110 may be any suitable entity or entities (e.g., software executing on a processor, an FPGA, an ASIC, or a combination of software, an FPGA, and/or an ASIC) for performing one or more aspects associated with communicating with and/or controlling NEPs or related resources. For example, NEPRA 110 may include or utilize software (e.g., a distributed control and orchestration layer or related API) that provides an interface for communicating with NEPs 114-118 or other test system entities and may be effectively hidden from user 124.

In some embodiments, NEPRA 110 may allocate and manage resources of NEPs 114-118 for emulated switches and can be external or internal to CM 108. In some embodiments, NEPRA 110 may include a resource allocator function configured for accessing user-specified switching fabrication emulation requirements or specification information and NEP resource information (e.g., user input and/or pre-defined knowledge) and to effectively translate the user's declared data center switching fabric emulation specification into a mapping of NEP resources and associated physical resource allocations, e.g., ASIC switch resources in one or more of NEPs 114-118).

For example, after user 124 specifies a switching fabric environment to be emulated (e.g., based on a library of pre-defined switching fabric environments) and specifies that only NEPs 114-118 are available for use in emulating the target data center topology, NEPRA 110 (or a related resource allocator function) may access a NEP resource information database and generate a physical switch resource allocation map that is applied to the switching hardware (e.g., ASICs, SoCs, etc.) contained in NEP 114. In this example, the generated physical switch resource allocation map may effectively enable the switch resources in NEP 114 to emulate the user-specified target data center topology.

Continuing with the above example, if user 124 subsequently selects NEP 116 to be added to the emulated switching fabric environment, NEPRA 110 or a related entity (e.g., a resource allocator function) may generate a new or updated physical switch resource allocation map that is applied to the switching hardware contained in NEP 114, where the updated physical switch resource allocation map may effectively enable the switch resources in NEPs 114-118 to emulate the user-specified target data center topology.

In some embodiments, NEPRA 110 may include a logical to physical adaptor usable for converting and/or translating communications to refer to virtual or physical resources depending on the destination. For example, when requesting information about available switching resources via NEPRA 110, external applications, user 124, and/or SUT 122 may "see" a set of emulated switches each with a subset of resources instead of physical switches in one of NEPs 114-118. In this example, e.g., for NEP 114, logical to physical adaptor 212 may translate information about logical resources into information physical resources of a switch (e.g., a Tomahawk 3 series switch) and vice versa so that interacting nodes may remain unaware of the underlying switch(es) or related switch resources. Continuing with this example, e.g., for NEP 116, logical to physical adaptor 212 may translate information about logical resources into information physical resources of a different type of switch (e.g., a Tomahawk 4 series switch) and vice versa so that interacting nodes may remain unaware of the underlying switch(es) or related switch resources.

In some embodiments, NEPRA 110 may act as an orchestrator and reside between a device interface and interacting entities, e.g., SUT 122, testing applications in NEPs 114-118, or external devices. In such embodiments, NEPRA 110 may act as a communications proxy or agent using a logical interface and an intermediate protocol or API. For example, after a test session is completed, NEPRA 110 may receive a user-specified request for requesting emulated switch performance metrics and, in response, may process or translate the request using a relevant generated physical switch resource map to query or poll the appropriate switch resources (e.g., in NEPs 114-118) in order to obtain and/or synthesize the relevant emulated switching fabric performance information. In this example, the emulated switching fabric performance information may be accessible to user 124 via one or more API(s) or UI(s) 104.

In some embodiments, emulated switch performance data associated with various switching levels or stages and types of generated test traffic may be queried or polled (e.g., on-demand, at prescribed intervals, periodically during test execution, etc.) and stored by test system 100 or entities therein. In such embodiments, the emulated switch performance data may be accessible to user 124 via one or more API(s) or UI(s) 104.

In some embodiments, test system 100 or entities thereof (e.g., CTC 102 and/or NEPRA 110) may utilize communications interface(s) 106 for interacting with various entities. Communications interface(s) 106 may include or utilize any suitable entity or entities (e.g., one or more network interface cards (NICs), pluggable jacks, physical processors, transceiver modules, direct-attach cables (DACs) and/or other hardware) for sending or receiving communications. For example, communications interface(s) 106 (e.g., physical or virtual links) may allow CTC 102 or other entities (e.g., CM 108 or NEPRA 110) to send configuration information, settings, instructions, or other data to one or more of NEPs 114-118. In another example, communications interface(s) 106 (e.g., via physical or virtual links) may allow CTC 102 or other entities to receive test results or feedback from SUT visibility tool 126, NEP visibility tools, or other entities.

Each of NEPs 114-118 may include hardware and software usable for network emulation and/or switching fabric emulation. For example, each of NEPs 114-118 may be a distinct or separate chassis comprising an implementation of a particular switch processor (e.g., a switching ASIC, a SoC, custom hardware, an FPGA, a software switch, etc.), and dedicated data and control plane test traffic generation hardware resources (e.g., an FPGA, a CPU, a programmable data plane device like a P4 device, etc.). In some embodiments, NEPs 114-118 may be interconnected via various communication ports or links, e.g., 10G links, 25G links, 40G links, 100G links, 100G links, 200G links, 400G links, etc.

In some embodiments, test system 100 or entities thereof (e.g., CTC 102, testing applications, and/or NEPRA 110) may include functionality for accessing data storage 112. Data storage 112 may be any suitable entity or entities (e.g., a storage device, a non-transitory computer readable medium, or a storage system) for maintaining or storing information related to data center emulation, network testing, or related test analysis. For example, data storage 112 may include data center emulation data (e.g., NEP resources to emulated switches, physical to logical port mapping, physical buffers to virtual buffers mapping, etc.) and related policies (e.g., virtual and real port speed, virtual and real throughput, topologies, forwarding rules, classes of service, etc.) for sharing physical switch resources amongst the emulated switches. Data storage 112 may also include test traffic models, test sessions, test session data, topology information for emulated switching fabric environments and/or for SUT 122, and/or other information usable for generating performance metrics (e.g., statistics) associated with one or more aspects of SUT 122. In some embodiments, data storage 112 may be located at test system 100, another node, or distributed across multiple platforms or devices.

It will be appreciated that FIG. 1 is for illustrative purposes and that various depicted entities, their locations, and/or their functions described above in relation to FIG. 1 may be changed, altered, added, or removed. For example, a device (e.g., a computer including at least one processor coupled to a memory) may include functionality of CTC 102, CM 108, and NEPRA 110.

Figure 2:
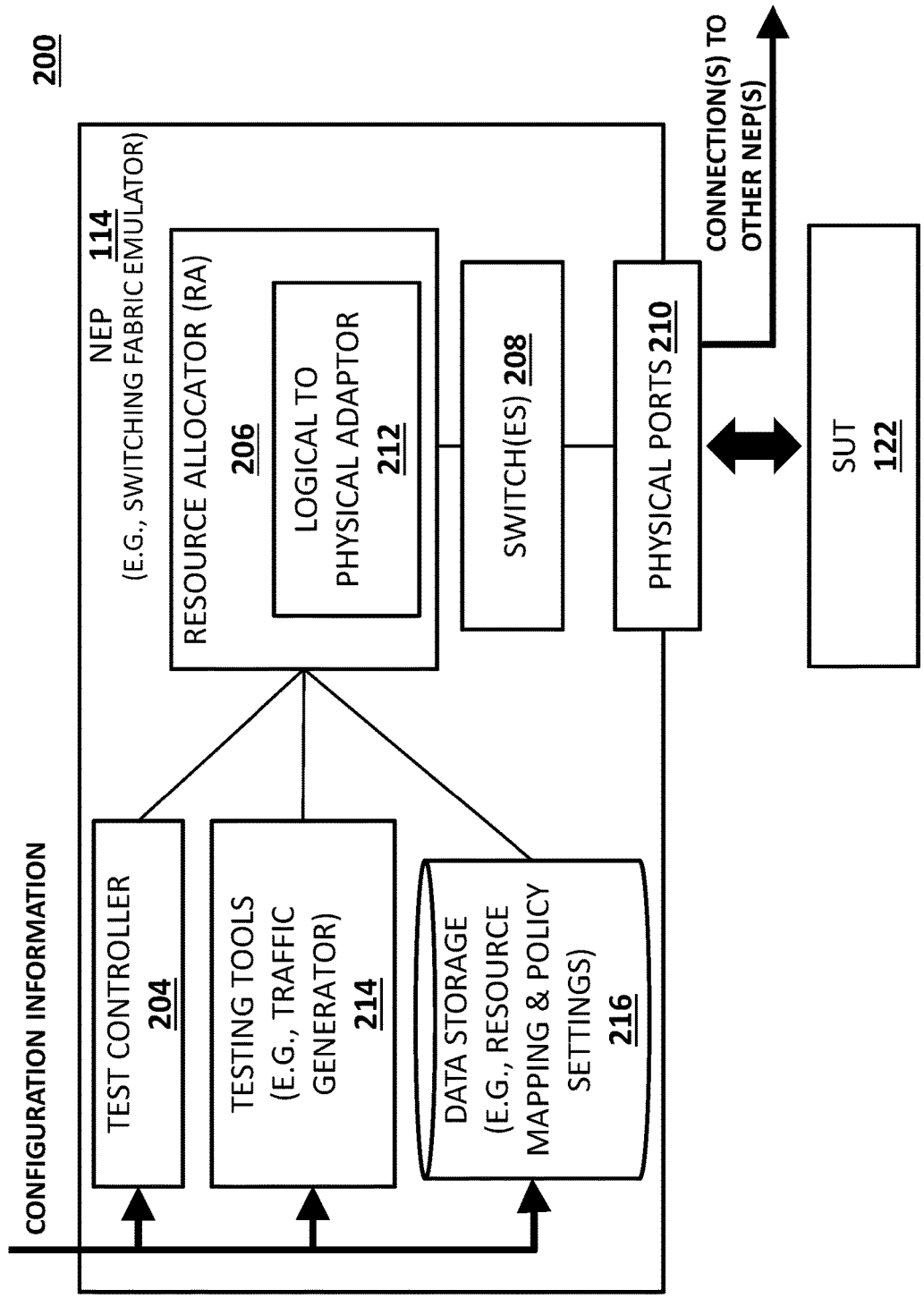
FIG. 2 is a diagram illustrating an example test environment comprising a network emulation platform (NEP)

FIG. 2 is a diagram illustrating a test environment 200 comprising NEP 114. In some embodiments, NEP 114 may include a stand-alone tool, a testing device, a network equipment test device or platform, or software executing on one or more processor(s). In some embodiments, NEP 114 may be a single device or node (e.g., a chassis) and may include one or more modules for emulating a data center or a switching fabric environment and/or may include one or more modules for performing various test related functions associated with the emulated switching fabric environment.

In some embodiments, NEP 114 may be configured to interact with and/or to be configured by CTC 102 or related entities (e.g., CM 108 and/or NEPRA 110). For example, NEP 114, along with other NEPs, may receive particular configuration information from CTC 102 or a related entity via an internal test API. In this example, the configuration information received by NEP 114 may include configuration instructions for configuring NEP 114 or resources therein for use in a testing scenario, e.g., involving one or more test sessions. In another example, the configuration information received by NEP 114 may include test related emulation requirements that are used by NEP 114 or entities therein in generating corresponding or compliant commands or instructions for configuring NEP 114 or resources therein.

NEP 114 may include a test controller (TC) 204, a resource allocator (RA) 206, switch(es) 208, ports 210, testing tools 214, and data storage 216. TC 204 may be any suitable entity or entities (e.g., software executing on a processor, an FPGA, and/or an ASIC, or a combination of software, an FPGA, and/or an ASIC) for performing one or more aspects associated with configuring resources in NEP 114 and/or for testing SUT 122. In some embodiments, TC 204 may be implemented using one or more processors and/or memory. For example, TC 204 may utilize one or more processors (e.g., executing software stored in memory) to generate traffic patterns or scenarios for various message streams (e.g., flows or sessions). In another example, TC 204 may also utilize one or more processors to perform or initiate various tests and/or analyses involving test packets and/or related responses from SUT 122. In this example, TC 204 may send instructions to various modules or entities in NEP 114, e.g., testing tools 214 for controlling (e.g., to pause, (re)start, or stop) a test session.

RA 206 may represent be any suitable entity or entities (e.g., software executing on a processor, an FPGA, and/or an ASIC, or a combination of software, an FPGA, and/or an ASIC) for performing one or more aspects associated with resource allocation, e.g., allocating resources of switch(es) 208 for emulating elements of a switching fabric. For example, RA 206 may include the same or similar functionality described above with regard to a SARA for allocating resources of a switching ASIC. In this example, RA 206 may also include functionality for allocating resources of other types of switch(es) 208.

In some embodiments, TC 204 may utilize out-of-band and/or in-band ports and/or interfaces for communicating with entities of NEP 114 or test system 100, e.g., CTC 102. For example, in embodiments where TC 204 is external to RA 206, TC 204 may communicate with RA 206 via a management port or related interface.

In some embodiments, TC 204 may interact with one or more testing tools 214. Testing tools 214 may represent software or hardware for testing SUT 122 and/or for performing various test related functions, e.g., performance monitoring, test traffic generation, and test analysis. In some embodiments, testing tools 214 can include, but are not limited to, visibility modules (e.g., packet analyzers), traffic generators, SDN controller applications, GUI and CLI applications, and/or test traffic generation applications for communicating with SUT 122 and/or emulation related tools.

In some embodiments, NEP 114 or aspects thereof may be controlled or defined using one or more user-definable data models. For example, CTC 102 may provide a GUI for allowing user 124 to configure or modify a RA model, a switching model, a switching fabric topology model, a traffic generator model, a network visibility model, etc. used in a testing scenario or a related emulated switching fabric environment. In this example, CTC 102 may send, to TC 204, high-level or user-definable data models indicating a switching fabric topology comprising one or more emulated switches and/or may indicate particular physical resources to allocate to each emulated switch. Continuing with this example, TC 204 or RA 206 may convert these data models into lower-level data models or related computer readable instructions for implementing an emulated switching fabric environment in accordance with the user-definable data models.

In some embodiments, testing tools 214 may include or utilize settings and/or configuration information from CTC 102 or another source for setting up a data center related testing scenario or a related test session. For example, received settings and/or configuration information may be usable for generating and sending test traffic that is different from or similar to traffic sent by SUT 122 during a test session. In another example, received settings and/or configuration information may be usable for instructing visibility infrastructure components for monitoring traffic and/or performance aspects associated with a testing scenario or a related emulated switching fabric environment.

In some embodiments, testing tools 214 may include or utilize a traffic engine or traffic generator. For example, a traffic generator may generate test traffic that is directed to traverse emulated logical switches or an emulated switching fabric environment. The emulated switching fabric environment may be configured so as to emulate a particular switching fabric or topology. In some embodiments, a traffic generator may include one or more test traffic receivers (e.g., test receive ports) that are configured to receive the test traffic and generate test metric information, which may be accessible to a visibility module of test system 100.

In some embodiments, test traffic may transit the emulated switching fabric environment without being received or transiting SUT 122. For example, user 124 may specify, via CM 108, levels and types of background test traffic that can be generated on some or all of the NEPs associated with a particular testing scenario or session. For example, some or all of this test traffic can be configured to transit the emulated switching fabric environment (but not SUT 122) during the execution of a test session involving SUT 122. In another example, some or all of this test traffic can be configured to transit SUT 122 during execution of a test session.

In some embodiments, testing tools 214 may include or utilize a visibility module and/or a related analyzer. In such embodiments, the visibility module and/or the related analyzer may be configurable by TC 204 for monitoring performance or telemetry information in a particular emulated switching fabric environment or topology. For example, a visibility module may be any suitable entity or entities (e.g., software executing on a processor, an ASIC, an FPGA, or a combination of software, an ASIC, or an FPGA) for maintaining network visibility (e.g., using virtual or physical probes or network taps). In this example, virtual taps or software may be configured to provide switch metrics or other information (e.g., network telemetry, switch and/or link status information, etc.) associated with one or more elements (e.g., emulated switches) of an emulated switching fabric environment. Continuing with this example, the visibility module may generate performance reports or test analysis reports associated with SUT 122, e.g., by utilizing the switch metrics or other information associated with packets that pass through or are generated by SUT 122.

In some embodiments, a visibility module may be configured for obtaining emulated logical switch performance metric information associated with a test session by polling RA 206 or another test system entity. For example, by polling for logical switch performance metric information associated with a test session, user 124 may observe how the operation of SUT 122 impacts the emulated switching fabric environment during a test run or session. Polling logical switch performance metric information associated with a test session may also be used for observing how conditions in the emulated switching fabric environment impact the DUT/SUT during a test run or session.

In some embodiments, a visibility module may be configured to obtain or generate telemetry or operational performance data associated with the emulated switches during the execution of a test session involving SUT 122. In such embodiments, the visibility module may correlate the telemetry or operational performance data with SUT endpoint operational activities and events (e.g., SUT operational actions as defined in a test session) and may report performance data and/or correlated SUT endpoint information to user 124.

Switch(es) 208 may represent one or more switch processors (e.g., a fixed-function or programmable ASIC or SoC) and may include additional hardware, firmware, and/or software for performing one or more functions associated with network switching. For example, switch(es) 208 may utilize an ASIC pipeline for performing frame or packet forwarding, e.g., sending a packet received from one port out another port of the switch. In some embodiments, various resources (e.g., lookup tables or match-action tables used for forwarding decisions, traffic manager buffer memory, traffic manager logical queues, etc.) of switch(es) 208 may be managed and/or allocated to provide emulated switches by RA 206.

Ports 210 may include or utilize any suitable entity or entities (e.g., one or more network interface cards (NICs), pluggable jacks, physical processors, transceiver modules, direct-attach cables (DACs) and/or other hardware) for sending or receiving communications. For example, TC 204 or RA 206 may configure one or more of ports 210 (e.g., physical connections) for receiving and sending various types of test packets or related data units, such as IP messages, Ethernet messages, packet data units (PDUs), datagrams, user datagram protocol (UDP) messages, transmission control protocol (TCP) messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other data units.

In some embodiments, ports 210 may include user traffic ports and management ports. For example, user traffic ports may be associated with processing, sending, and/or receiving test traffic, non-test traffic, and/or in-band management related communications and management ports may be associated with processing, sending, and/or receiving out-of-band management related communications.

In some embodiments, ports 210 may include multiple port modules or groups of ports for interacting with SUT 122. For example, depending on a test operator's configuration settings or a particular test session setup, RA 206 may allocate a portion of physical resources to each switch that is emulated, where the emulated switches are collectively used to mimic a data center switching fabric. In some embodiments, each emulated switch may be allocated or associated with one or more of ports 210 and the port association may be static or semi-static (e.g., particular ports may be assigned to an emulated switch for a given test session).

In some embodiments, ports 210 may include or interact with a port virtualizer module or related functionality for virtualizing a physical port into multiple independent logical ports. For example, a physical connector cage may be treated as a single logical port with an aggregate speed based on the number of and speed of the lanes of the physical cable in the physical connector cage assigned to or used by the logical port. In another example, a physical connector cage may be treated as multiple logical ports of different aggregate or individual speeds based on the lanes assigned to or used by each logical port.

In some embodiments, a port virtualizer module (e.g., software executing on a port module) may configure a physical port (e.g., a front-panel or back-panel port) to act as multiple distinct logical ports, where each logical port may utilize a distinct portion of a physical cable connected thereto for communications. In this example, assuming a physical port is a 400G port and that the physical port is virtualized to act as four independent logical ports, then each logical port may be configured to act as a 100G port, where each logical port utilizes a distinct lane (e.g., a physical-layer lane) of a connected 400G physical cable). In another example, assuming a physical port is a 200G port and that the physical port is virtualized to act as eight independent logical ports, then each logical port may be configured to act as a 25G port, where each logical port utilizes a distinct lane (e.g., a physical-layer lane) of a connected 200G physical cable).

In some embodiments, ports 210 or related entities may be configured to implement routing path groups, e.g., LAGs, load balancing groups, or ECMP groups. For example, CTC 102 may configure a test environment to utilize a number of ECMP groups, where logical ports are uniquely associated with particular ECMP groups. In this example, test traffic may include or indicate different ECMP group identifier and ports 210 or related entities may be configured to forward or route traffic via logical ports according to their corresponding ECMP group identifier.

In some embodiments, RA 206 may be any suitable entity or entities (e.g., software executing on a processor, an FPGA, an ASIC, or a combination of software, an FPGA, and/or an ASIC) for performing one or more aspects associated with allocating resources to emulated switches and/or managing emulated switches. In some embodiments, RA 206 may allocate and manage resources of switch(es) 208 for providing emulated switches without requiring a custom ASIC pipeline. In some embodiments, RA 206 can be external or internal to switch(es) 208.

In some embodiments, RA 206 may utilize one or more management ports or related interfaces for communicating with a controller or related applications (e.g., CTC 102, TC 204 and/or testing tools 214) and/or for communicating with switch(es) 208. For example, TC 204 or a related application may communicate with RA 206 via an out-of-band management port or related interface. In this example, RA 206 may send instructions or other communications to switch(es) 208 via another management port or related interface.

In some embodiments, RA 206 may include a logical to physical adaptor 212. Logical to physical adaptor 212 may be any suitable entity or entities (e.g., software executing on a processor, an FPGA, an ASIC, or a combination of software, an FPGA, and/or an ASIC) for converting and/or translating communications to refer to logical (e.g., virtual) or physical resources depending on the destination. For example, when requesting information about available switching resources via RA 206, testing tools 214 and/or SUT 122 may "see" a set of emulated switches each with a subset of resources instead of switch(es) 208. In this example, logical to physical adaptor 212 may translate information about logical resources into information about physical resources of a single switch (e.g., Tomahawk 3) and vice versa so that interacting nodes may remain unaware of the underlying switch(es) 208 or related switch resources.

In some embodiments, RA 206 and/or logical to physical adaptor 212 may reside between a native device interface and interacting entities (e.g., SUT 122, testing tools 214, or external devices) and may act as a communications proxy or agent using a logical interface. For example, SUT 122 may include a network switch controller that configures switching resources by sending, via a logical interface associated with RA 206, configuration requests for requesting and/or configuring one or more switches. In this example, RA 206 and/or logical to physical adaptor 212 may translate the configuration requests received via the logical interface into one or more corresponding requests for transmission via a native switch interface, where the corresponding requests include commands for configuring appropriate physical resources of underlying switch(es) 208. Further, RA 206 and/or logical to physical adaptor 212 may translate switch performance results coming from a native switch interface into virtualized results (e.g., link status or counter values for a physical port may be changed to values for a corresponding logical port on an emulated switch 'TORSW1') before sending the virtualized results to the network switch controller via the logical interface.

In some embodiments, RA 206 and/or logical to physical adaptor 212 may create, store, and/or use switching ASIC emulation data (e.g., physical to logical port mapping, physical buffers to virtual buffers mapping and resource allocation, etc.) and related policies (e.g., virtual and real port speed, virtual and real throughput, topologies, forwarding rules, classes of service, etc.) for sharing physical switch resources amongst the emulated switches. For example, by using port mapping data and policies stored in data storage 216, logical ports on an emulated switch 'TORSW1' may be translated into one or more physical ports. In this example, configuration commands for setting speed of a particular logical port can be translated so that the speed of corresponding physical port is set. Continuing with this example, to query the statistical counters for the logical port, the statistical counters for the corresponding physical port may be queried.

In some embodiments, RA 206 and/or logical to physical adaptor 212 may utilize a modified proprietary (e.g., vendor) API (e.g., a vendor's software development kit (SDK)) or by utilizing a wrapper API that interacts with a vendor API. For example, by using a wrapper API, RA 206 can manage a fleet of emulated switches using off-the-shelf or commodity ASICs with NOSes that utilize a proprietary or vendor API.

In some embodiments, RA 206 and/or logical to physical adaptor 212 may utilize a custom adaptor that handles certain applications or functions which may involve a subset of resource management and mapping requirements than a standard switching API. For example, by using a custom adaptor, RA 206 can manage a fleet of emulated switches for certain use cases using off-the-shelf or commodity ASICs.

In some embodiments, NEP 114 or entities thereof (e.g., TC 204, testing tools 214, and/or RA 206) may include functionality for accessing data storage 216. Data storage 216 may be any suitable entity or entities (e.g., a storage device, a non-transitory computer readable medium, or a storage system) for maintaining or storing information related to switching ASIC emulation, network testing, or related test analysis. For example, data storage 216 may include switching ASIC emulation data (e.g., physical to logical port mapping, physical buffers to virtual buffers mapping, etc.) and related policies (e.g., virtual and real port speed, virtual and real throughput, topologies, forwarding rules, classes of service, etc.) for sharing physical switch resources amongst the emulated switches. Data storage 216 may also include test traffic models, test sessions, test session data, topology information for emulated switching fabric environments, information usable for generating performance metrics (e.g., statistics) associated with one or more aspects of SUT 122, and/or other information associated with testing SUT 122. In some embodiments, data storage 216 may be located at NEP 114, another node, or distributed across multiple platforms or devices.

It will be appreciated that FIG. 3 is for illustrative purposes and that various depicted entities, their locations, and/or their functions described above in relation to FIG. 3 may be changed, altered, added, or removed. For example, NEP 114 may include a chassis or rack including one or more computers (e.g., blade computers) each including at least one processor coupled to a memory, e.g., data storage 216. In this example, each server may include functionality of TC 204, RA 206, and/or testing tools 214.

Figure 3:
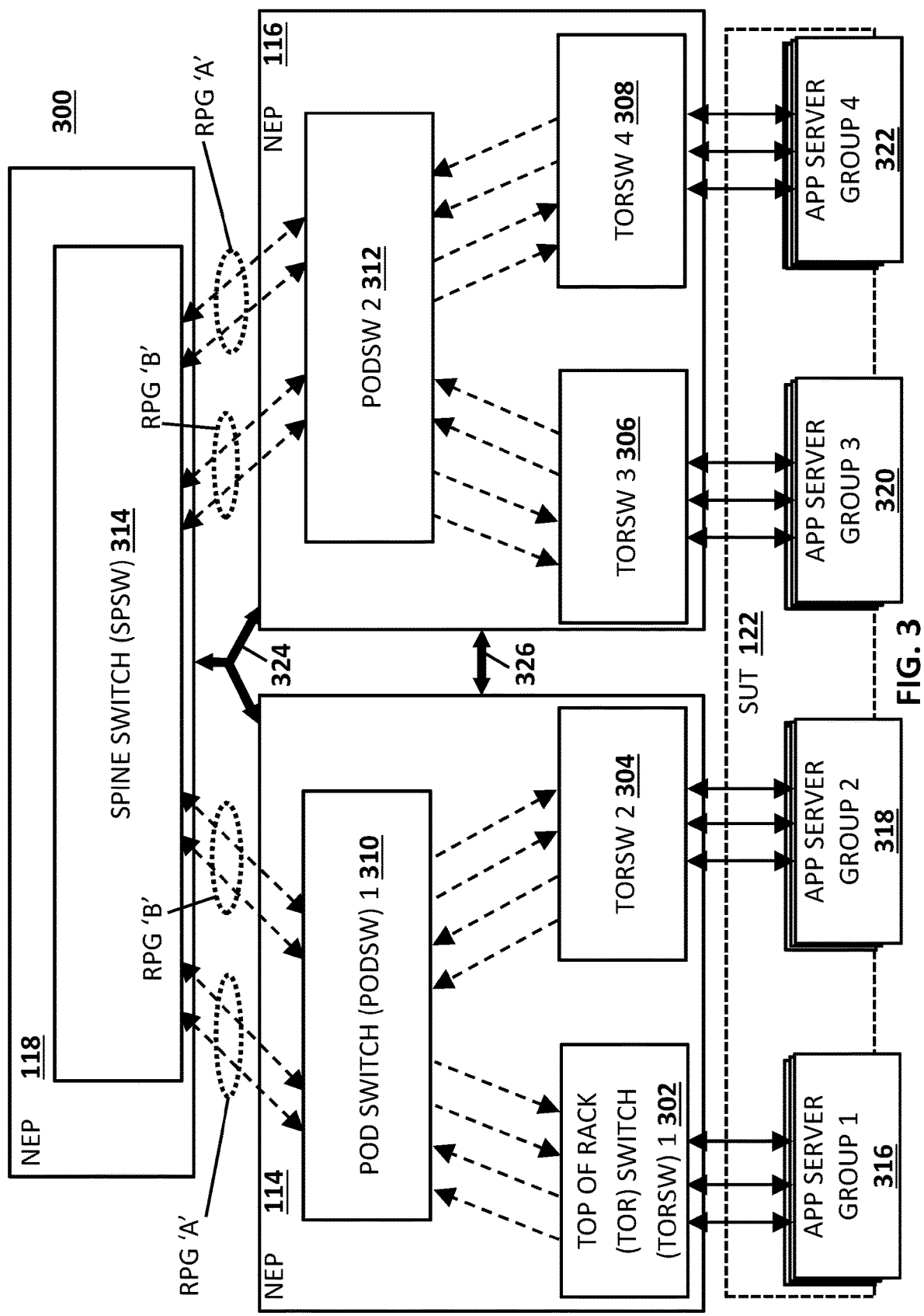
FIG. 3 is a diagram illustrating an example emulated switching fabric usable for network testing.

FIG. 3 is a diagram illustrating an example emulated switching fabric 300 usable for network testing. Emulated switching fabric 300 may represent a switching fabric or a data center switching architecture comprising a network of emulated switches (e.g., traffic forwarding devices) for forwarding packets from or to SUT 122 or other entities, where the emulated switches may be connected via a particular (e.g., user-defined) logical topology. For example, emulated switching fabric 300 may be implemented using resources (e.g., switches 208) of NEPs 114-118 and configured based on user input and/or predetermined environment templates or data models, e.g., stored in data storage 216.

In some embodiments, e.g., where emulated switching fabric 300 uses multiple NEPs (e.g., NEPs 114-118), physical connections or links may be used for communicatively connecting NEPs or physical resources therein. For example, each of NEPs 114-118 may use one or more of its physical ports 210 for interconnecting or linking with other NEPs, e.g., via 40G or 100G links. In another example, each of NEPs 114-118 may be communicatively connected via wireless transceivers.

Referring to FIG. 3, emulated switching fabric 300 may represent a 3-stage Clos switching network comprising different stages of emulated switches, wherein each emulated switch is implemented using physical resources of NEP 114 and/or 116. As depicted in FIG. 3, stage one switches of emulated switching fabric 300 include top of rack (TOR) switches (TORSWs) 302 and 304 implemented on NEP 114 and TORSWs 306 and 308 implemented on NEP 116. Stage two switches of emulated switching fabric 300 include cluster or pod switch (PODSW) 310 implemented using NEP 114 and PODSW 312 implemented on NEP 116. Stage three of emulated switching fabric 300 include a spine switch (SPSW) 314 implemented on NEP 118. In some embodiments, TORSWs 302-308 may represent or emulate switches that are connected to multiple servers (e.g., located within a rack or nearby rack), PODSWs 310-312 may each represent or emulate an aggregation switch that is connected to multiple TORSWs, and SPSW 314 may represent or emulate a higher-level aggregation switch that is connected to multiple PODSWs, e.g., PODSWs 310 and 312.

In FIG. 3, virtual or logical links between emulated switches implemented on a single NEP (e.g., links between PODSW1 310 and TORSW1 302) are shown as unidirectional links and may utilize loopback connections. Virtual links between emulated switches implemented on different NEPs (e.g., links between PODSW 310 and SPSW 314) are shown as bidirectional links and may utilize at least one physical cable 324 for connecting NEPs 114-118. For example, physical cable 324 may be a 400G breakout cable and may connect NEP 118 to NEP 114 and NEP 116, where each of the connections (e.g., NEP 118 to NEP 114 and NEP 118 to NEP 116) may have a 200G capacity. At least one physical cable 326 may also be used to directly connect NEP 114 and NEP 116 and one or more physical cables may be used to connect SUT 122 or entities therein to NEP 114 or NEP 116.

In some embodiments, emulated switching fabric 300 may utilize routing path groups for communications between emulated switches implemented on multiple or different NEPs. For example, as depicted in FIG. 3, a routing path group 'A' may include or utilize two virtual links connecting PODSW 310 and SPSW 314 and two virtual links connecting PODSW 312 and SPSW 314 and a routing path group 'B' may include or utilize two virtual links connecting PODSW 310 and SPSW 314 and two virtual links connecting PODSW 312 and SPSW 314. In some embodiments, e.g., where physical cable 324 has eight distinct lanes, each of these virtual links (e.g., between PODSW 310 or PODSW 312 and SPSW 314) may utilize a unique or distinct lane of physical cable 324.

In some embodiments, characteristics (e.g., bandwidth, capacity, supported protocols, or processing speed or throughput) of emulated switches may be varied as defined by test configuration information or related settings. For example, each of NEPs 114-118 may include a different brand, type, and/or version of switches 208 and/or other hardware. In this example, depending on user input and/or configuration information, NEPRA 110 may indicate which NEP is to emulate which emulated switches based on NEP capabilities and user requirements for emulated switching fabric 300.

In some embodiments, some physical ports of switch(es) 208 of NEPs 114-118 may be associated with different emulated switches and may utilize loopback interfaces or internal interfaces for emulating communications between some emulated switches, while other emulated switches (e.g., TORSWs 302-308) may utilize physical interfaces and/or physical cabling for communicating with SUT 122 or portions thereof.

In some embodiments, SUT 122 may represent or include a set of application server groups 316-322, each representing one or more servers and/or applications. For example, application server group 1 316 may include multiple servers (e.g., 16 or more servers in a single rack), each having one or more connections to a TOR switch. In some examples, a server of application server groups 316-322 may include multiple applications or perform different services (e.g., machine learning (M/L), storage offload, search engines, webpages, video streaming, email, etc.) for users or may perform similar services for different sets of users. In some examples, a server of application server groups 316-322 may act as a client to another server.

In some embodiments, each of application server groups 316-322 may be connected (e.g., physically cabled) to a distinct set of physical ports 210 of switch(es) 208 in NEP 114 or NEP 116, where each set of physical ports 210 is assigned or allocated to a particular emulated switch. For example, RA 206 of NEP 114 may assign particular physical ports (e.g., '1', '2', and '3') to an emulated switch 'TORSW1' and may virtualize those physical ports as corresponding virtual ports (e.g., '3', '4', and '5', respectively). In this example, applications and/or servers in application server group 1 316 may be communicatively coupled to one or more of the logical ports of the emulated switch 'TORSW1'.

In some embodiments, configuration information may include any suitable information for mapping logical ports associated with emulated switching fabric 300 to physical ports of switch(es) 208 in one of NEPs 114-118. In some embodiments, configuration information may be stored or maintained in data storage 216 and may be usable for translating port information or related information in switch configuration commands, performance metrics, and/or other communications.

It will be appreciated that FIG. 3 is for illustrative purposes and that various depicted entities, their locations, and/or their functions described above in relation to FIG. 3 may be changed, altered, added, or removed.

Figure 4:
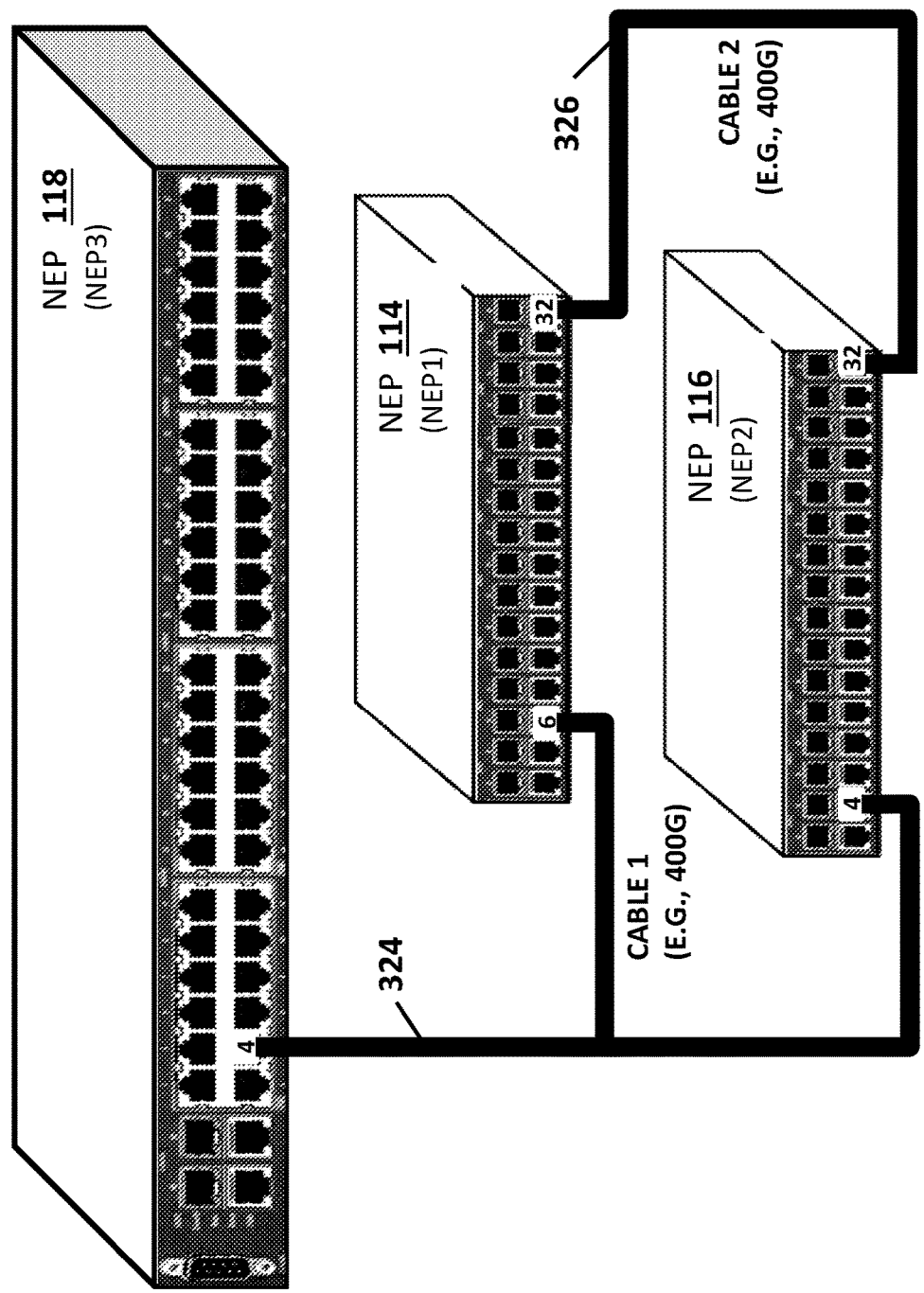
FIG. 4 is a diagram illustrating an example test environment involving multiple NEPs.

FIG. 4 is a diagram illustrating an example test environment 400 involving NEPs 114-118. Test environment 400 may include NEPs 114-118 configured (e.g., by CTC 102) to provide emulated switching fabric 300 comprising emulated switches (e-switches) 302-314. As depicted in FIG. 4, NEP 118 is connected to NEPs 114 and 116 via a physical cable 324 (e.g., a 400G breakout cable) from physical port '4' of NEP 118 to physical port '6' of NEP 114 and to physical port '4' of NEP 116, where each connection is a portion (e.g., 200G) of the capacity of physical cable 324. Further, as depicted in FIG. 4, NEP 114 and NEP 116 are connected via a physical cable 326 (e.g., a 400G cable) from physical port '32' of NEP 114 to physical port '32' of NEP 116. In some embodiments, emulated switching fabric 300 may also be connected to SUT 122 (e.g., physical hosts, storage servers, web servers, etc.) via one or more physical cables connecting SUT 122 to at least one or more of NEPs 114-118.

In some embodiments, CTC 102 (not shown in FIG. 4) may include or comprise test system 100, CM 108, NEP functionality, or other functionality. For example, CTC 102 or CM 108 may generate or receive configuration information for setting up and configuring emulated switching fabric 300. In this example, the configuration information may instruct NEPRA 110 in virtualizing physical switching resource(s) for emulating e-switches 302-314 and related emulated packet queues (e.g., buffers) for testing SUT 122. In this example, each of e-switches 302-314 may be allocated a portion of resources associated with switch(es) 208 (e.g., an ASIC switching chip or a programmable switching chip) of one or more NEPs 114-118 and each emulated packet queue associated with one of e-switches 302-314 may be allocated a portion of a physical queue or buffer of respective switch(es) 208.

In some embodiments, configuring emulated switching fabric 300 may involve allocating, (e.g., statically, semi-statically, or dynamically) to an emulated switch, one or more "front-panel" or "back-panel" traffic ports of NEPs 114 and 116 for connecting physical cables to SUT 122 (e.g., servers or hosts that utilize switching fabric services), to each other, and/or to other devices or platforms.

In some embodiments, physical cables (e.g., fiber cables) may not be required to link emulated switches because internal loopback interfaces can obviate the need for external cabling within NEP 114 or within NEP 116. In some embodiments, one or more physical cables may be used to connect emulated switches or portions thereof because the emulated switches may utilize resources from multiple or different NEPs (e.g., NEPs 114 and 116).

In some embodiments, CTC 102 may send configuration information to each of NEPs 114-118 for implementing routing path groups for use during a test session or group of test sessions involving test environment 400. For example, CTC 102 may send configuration information to NEPs 114 and 116 indicating that each of their physical port '32' should be configured to act as four independent logical ports. In this example, each logical port may be configured to utilize a virtual link comprising a distinct lane of physical cable 326. Continuing with this example, as part of implementing routing path groups, each emulated switch or one or more related logical ports may be associated with a different routing path group such that traffic associated with a particular routing path group identifier is forwarded via an appropriate logical port and/or link. In some embodiments, logical ports and/or links may utilize breakout cables such that logical ports can connect different NEPs and emulated switches implemented thereon.

In some embodiments, test environment 400 may include a visibility module or related functionality. For example, a visibility module may be software-based and/or co-located at CTC 102, NEPs 114 and 116, and/or other test system elements. In another example, a visibility module may be a device separate from CTC 102 and NEPs 114 and 116.

It will be appreciated that FIG. 4 is for illustrative purposes and that various depicted entities, their locations, and/or their functions described above in relation to FIG. 4 may be changed, altered, added, or removed.

FIG. 5 is a diagram illustrating example port mapping data 500 for mapping logical ports of emulated switches (e.g., TORSWs 302-308) to physical ports of switch(es) 208 in one of NEPs 114-118. In some embodiments, port mapping data 500 or portions or variations thereof may be accessed and/or stored by CTC 102, NEPRA 110, CM 108 using one or more data structures or storage devices (e.g., data storage 112). In some embodiments, port mapping data 500 or portions or variations thereof may be accessed and/or stored by TC 204 and/or RA 206 of one or more of NEPs 114-118 using one or more data structures or storage devices (e.g., data storage 112).

In some embodiments, port mapping data 500 may include any suitable information for mapping logical ports associated with emulated switching fabric 300 to physical ports of switch(es) 208 in one of NEPs 114-118. In some embodiments, port mapping data 500 may be stored or maintained in data storage 216 and may be usable for translating port information or related information in switch configuration commands, performance metrics, and/or other communications.

Referring to FIG. 5, port mapping data 500 may be depicted using a table representing associations between logical port information and physical port information. For example, each row or association may include a topology identifier (TID), an NEP ID, an emulated switch identifier (ESID), a logical port number, a physical switch identifier (PSID), and a physical port number.

In some embodiments, a TID may include any suitable identifier, such as one or more numbers or values, usable for identifying a switching topology or emulated switching fabric 300. For example, a test operator may select a 3-stage Clos network environment with particular characteristics to emulate for a first test session, a 3-stage Clos network environment with different characteristics to emulate for a second test session, a 5-stage Clos network environment with particular characteristics to emulate for a third test session, and a 7-stage Clos network environment with particular characteristics to emulate for a fourth test session. In this example, each switching topology or emulated data center environment may have a different, unique TID, e.g., 1, 2, 3, and 4, respectively.

In some embodiments, a NEP ID may include any suitable identifier, such as one or more numbers or values, usable for identifying a NEP. For example, NEPs 114-118 may each have a unique name and/or number, e.g., 'NEP1', '345AR324T', 'N-1', etc. In some embodiments, NEP IDs may be unique within a test system or emulated switching fabric 300. In some embodiments, NEP IDs may be unique amongst multiple (or even all) NEPs controlled by an operator or service provider.

In some embodiments, an ESID may include any suitable identifier, such as one or more numbers or values, usable for identifying an emulated switch. For example, emulated switching fabric 300 may have seven emulated switches, each switch having a unique name and/or number, e.g., 'TORSW1', 'A', '234553242', etc. In some embodiments, ESIDs may be unique within a topology or emulated switching fabric 300. In some embodiments, ESID may be unique amongst multiple (or even all) defined topologies or emulated data center environments.

In some embodiments, a logical port number may include any suitable identifier, such as one or more numbers or values, usable for identifying a port of an emulated switch. For example, an emulated switch 'PODSW1' of emulated switching fabric 300 may have multiple logical ports, each having a unique name and/or number at least within that emulated switch, e.g., logical ports '5', '7', '9', etc. In some embodiments, logical port numbers may be unique within a topology or an emulated data center environment. In some embodiments, logical port numbers may be unique amongst multiple (or even all) defined topologies or emulated data center environments.

In some embodiments, a PSID may include any suitable identifier, such as one or more numbers or values, usable for identifying a physical switch, e.g., switch(es) 208. For example, NEPs 114-118 may each have one or two switches 208, each switch having a unique name and/or number, e.g., 'SW1', 'A', '234553242', etc. In some embodiments, PSIDs may be unique within a test system or a emulated data center environment. In some embodiments, PSIDs may be unique amongst multiple (or even all) NEPs controlled by an operator or service provider.

In some embodiments, a physical port number may include any suitable identifier, such as one or more numbers or values, usable for identifying a port of switch 208. For example, each switch 208 may have multiple physical traffic ports, each having a unique name and/or number at least within each physical switch, e.g., '1', '2', '3', etc. In some embodiments, physical port numbers may be unique within each of switches 208. In some embodiments, physical port numbers may be unique amongst multiple (or even all) switch(es) 208, e.g., used in emulated switching fabric 300.

In some embodiments, (e.g., where multiple topologies are stored in a data structure), a TID, a NEP ID, an ESID, and a logical port number may be used as a combination lookup key or value for identifying a corresponding NEP, physical switch, and physical port. In some embodiments, e.g., where one topology is stored in a data structure, a NEP ID, an ESID, and a logical port number may be used as a combination key or value for identifying a corresponding NEP, physical switch, and physical port. In some embodiments, e.g., where each logical port number is unique in an emulated switching fabric 300, a logical port number may be used as a lookup key or value for identifying a corresponding NEP, physical switch, and physical port.

It will be appreciated that port mapping data 500 in FIG. 5 is for illustrative purposes and that different and/or additional information may also be stored or maintained. Further, it will be appreciated that port mapping data 500 or related data may be stored in various data structures, memories, media, and/or in one or more locations.

FIG. 6 is a diagram illustrating example forwarding data 600 for forwarding or routing traffic associated with routing path groups, e.g., ECMP groups, load balancing groups, or LAGs. In some embodiments, forwarding data 600 or portions or variations thereof may be accessed and/or stored by CTC 102, NEPRA 110, CM 108, and/or other entities using one or more data structures or storage devices (e.g., data storage 112). In some embodiments, forwarding data 600 or portions or variations thereof may be accessed and/or stored by TC 204, RA 206, ports 210, and/or other entities of one or more of NEPs 114-118 using one or more data structures or storage devices (e.g., data storage 112).

In some embodiments, forwarding data 600 may include any suitable information for determining how to forward or route traffic from PODSW 310 or PODSW 312 (e.g., implemented or emulated by NEP 114 or NEP 116, respectively) to SPSW 314 (e.g., implemented or emulated by NEP 118) or vice versa. For example, forwarding data 600 may indicate that a first traffic flow (e.g., a set of related packets) should be sent to a particular next hop (e.g., logical port '40' of SPSW 314) from PODSW 310, while a second traffic flow should be sent to a different next hop (e.g., logical port '42' of SPSW 314) from PODSW 310. In this example, the two logical ports may utilize the same physical port (e.g., port '4' of NEP 118) but may send or forward traffic via different physical-layer lanes of physical cable 324 according to a routing path group associated with the traffic.

Referring to FIG. 6, forwarding data 600 may be depicted using a table representing associations between traffic information, routing path group information, and next hop information. For example, each row or association may include a hash value, a path identifier (e.g., a route key), a routing path group, a next hop logical port, a next hop physical port, and metadata (e.g., information about the underlying physical cable(s) connecting NEPs 114-118).

In some embodiments, a hash value or a route key may include any suitable identifier for identifying a flow of packets or related packets. For example, when implementing routing path groups, NEPs 114-118 or other entities may compute a hash value for a packet based on destination address, destination port, and/or other packet characteristics or may obtain or derive a route (e.g., a routing path group identifier) associated with a packet. In this example, the hash value or route key may be used in selecting the appropriate next hop associated with a corresponding routing path group, e.g., Group 'A' or Group 'B'.

In some embodiments, a routing path group may include any suitable identifier for uniquely identifying a routing path group, e.g., a LAG, load balancing group, or ECMP group. For example, when implementing routing path groups for a test session, NEPs 114-118 or other entities may assign logical ports and related links to different routing path groups, e.g., Group 'A' or Group 'B'. In this example, each logical port may utilize a portion (e.g., one or more physical-layer lane) of a physical cable when communicating between emulated elements provided by different NEPs.

In some embodiments, a next hop logical port may include any suitable information for identifying a logical next hop (e.g., a logical port of an emulated switch) for a packet or flow. For example, when implementing routing path groups for a test session, NEPs 114-118 or other entities may identify that some logical ports of SPSW 314 (e.g., logical ports '40', '41', '46', and '47') are associated with an ECMP group 'A' and other logical ports of SPSW 314 (e.g., logical ports '42', '43', '44', and '45') are associated with an ECMP group 'B'.

In some embodiments, a next hop physical port may include any suitable information for identifying a physical next hop (e.g., a physical port of NEP 118) for a packet or flow. For example, when implementing routing path groups for a test session, logical ports of SPSW 314 (e.g., logical ports '40', '41', '42', '43', '44', '45', '46', and '47') may utilize the same physical port of NEP 118 (e.g., NEP3, port '4') when traffic is forwarded from PODSW 310 (e.g., implemented or emulated by NEP 114) to SPSW 314 (e.g., implemented or emulated by NEP 118).

In some embodiments, metadata may include any information about a virtual link, a logical port, and/or a related physical cable. For example, when implementing routing path groups for a test session, metadata may indicate physical connection details, such as which lane or lanes of a physical cable are used to reach the next hop for a given virtual link or logical port. In this example, e.g., as depicted in FIG. 6, two distinct lanes (e.g., lanes '1' and '2') of a physical cable may be associated with one routing path group (e.g., Group 'A'), while the other distinct lanes (e.g., lanes '3' and '4') of the physical cable may be associated with a different routing path group (e.g., Group 'B').

It will be appreciated that forwarding data 600 in FIG. 6 is for illustrative purposes and that different and/or additional information may also be stored or maintained. Further, it will be appreciated forwarding data 600 or related data may be stored in various data structures, memories, media, and/or in one or more locations.

Figure 7A:
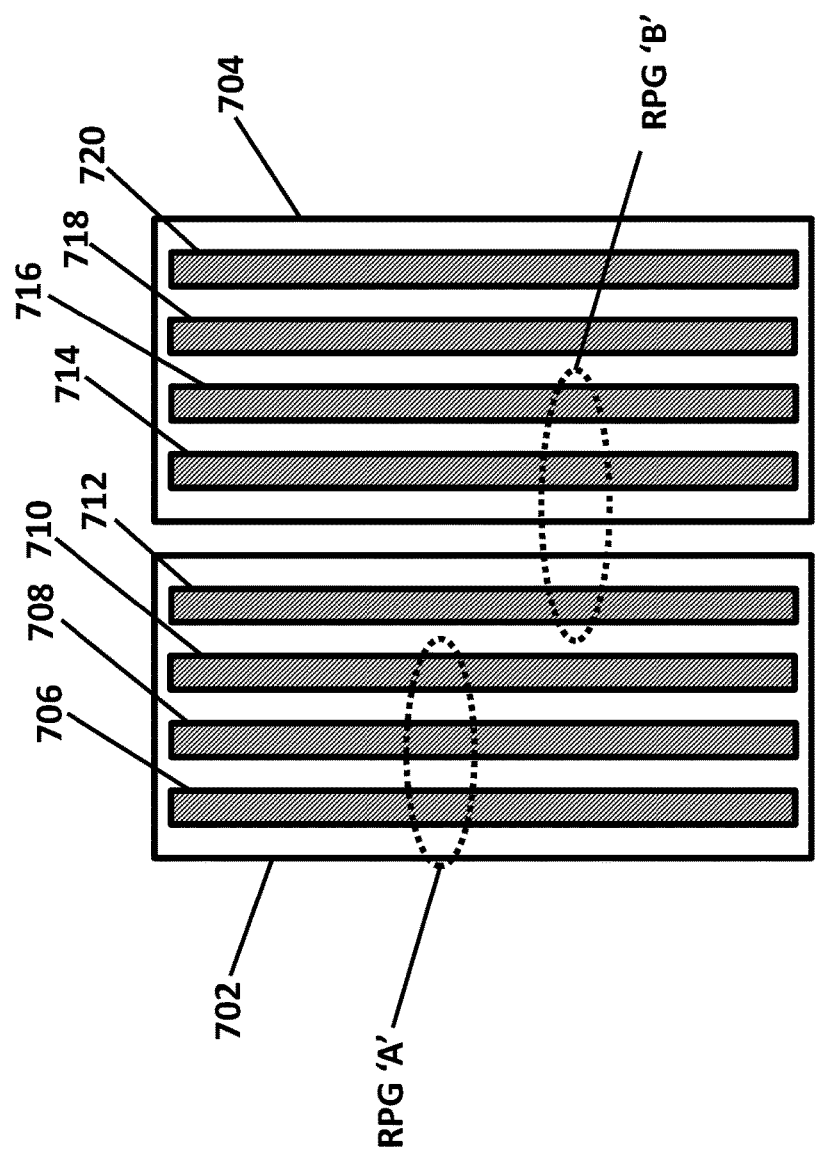
FIGS. 7A and 7B are diagrams illustrating example routing path group configurations.
Figure 7B:
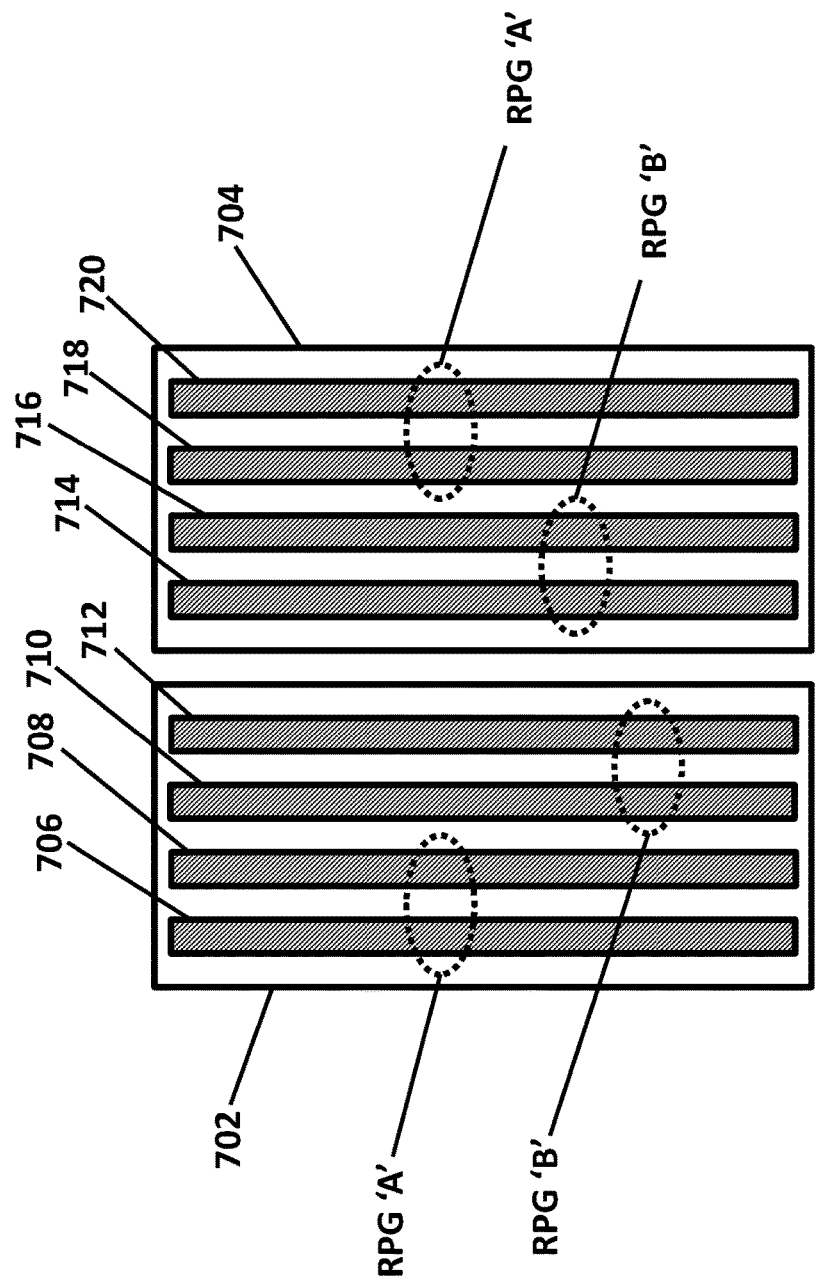

FIGS. 7A and 7B are diagrams illustrating example routing path group configurations. Referring to FIGS. 7A and 7B, two physical cables 702 and 704 (e.g., fiber cables, optical cables, Ethernet cables, etc.) are depicted, each with 4 distinct lanes (e.g., physical layer lanes). For example, as depicted in FIGS. 7A and 7B, cable 702 includes lanes 706-712 and cable 704 includes lanes 714-720. In some embodiments, e.g., where both cables 702 and 704 connect the same two physical devices or platforms (e.g., NEPs 114 and 116), test system 100 or entities therein (e.g., CTC 102 and/or CM 108) may configure and implement routing path groups (e.g., load balancing groups, ECMP groups, etc.), where each routing path group can utilize one or more lanes of cables 702 and/or 704. It will also be appreciated that while each of cables 702 and 704 may connect two physical devices or platforms (e.g., NEPs 114 and 116), some lanes of a cable (e.g., cable 702) may be used for communicating traffic between a first set of emulated switches (e.g., e-switches 304 and 306), while other lanes of the same cable may be used for communicating traffic between a second set of emulated switches (e.g., e-switches 310 and 312).

Referring to FIG. 7A, a routing path group configuration 700 including two routing path groups, RPG 'A' and RBG 'B', is depicted. In configuration 700, RBG 'A' includes or utilizes lanes 706, 708, and 710 of cable 702 and RBG 'B' includes or utilizes lane 712 of cable 702 and lanes 714 and 716 of cable 704. In some embodiments, to implement configuration 700, NEPs 114 and 116 may utilize port virtualization to virtualize physical ports (e.g., the actual ports where cables 702 and 704 are plugged in) into one or more virtual ports. In such embodiments, traffic associated with RBG 'A' may be sent or received via virtual port(s) that utilize one or more virtual links supported by (e.g., implemented via) lanes 706, 708, and/or 710 and traffic associated with RBG 'B' may be sent or received via virtual port(s) that utilize one or more virtual links supported by lanes 712, 714, and/or 716.

Referring to FIG. 7B, a second routing path group configuration 722 including two routing path groups, RPG 'A' and RBG 'B', is depicted. In configuration 722, RBG 'A' includes or utilizes lanes 706 and 708 of cable 702 and lanes 718 and 720 of cable 704; and RBG 'B' includes or utilizes lane 710 and 712 of cable 702 and lanes 714 and 716 of cable 704. In some embodiments, to implement configuration 722, NEPs 114 and 116 may utilize port virtualization to virtualize physical ports (e.g., the actual ports where cables 702 and 704 are plugged in) into one or more virtual ports. In such embodiments, traffic associated with RBG 'A' may be sent or received via virtual port(s) that utilize one or more virtual links supported by lanes 706, 708, 718, and/or 720 and traffic associated with RBG 'B' may be sent or received via virtual port(s) that utilize one or more virtual links supported by lanes 710, 712, 714, and/or 716.

It will be appreciated that routing path group configurations 700 and 722 are for illustrative purposes and that different and/or additional routing path group configurations may be used by test system 100 or related entities.

Figure 8:
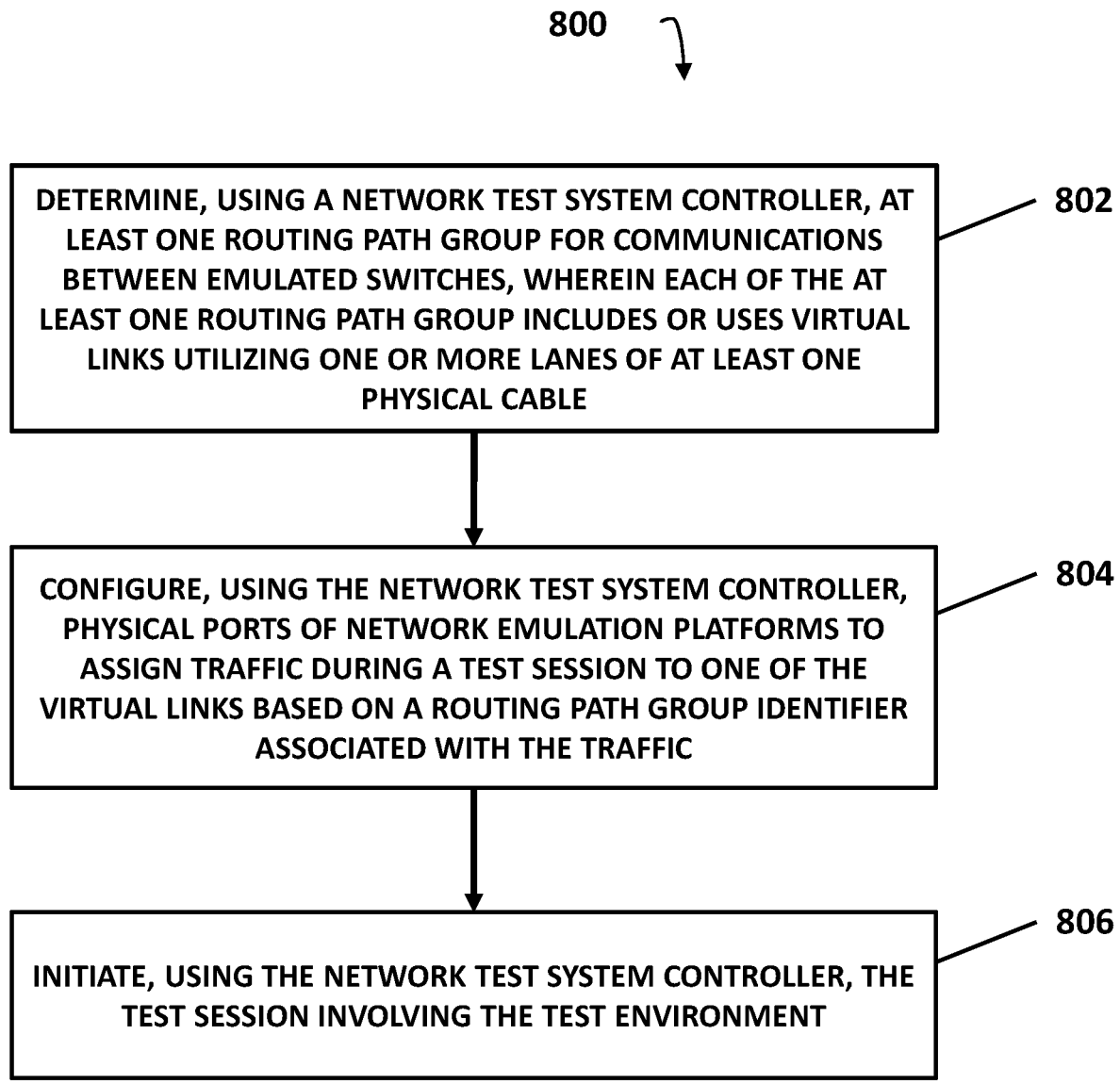
FIG. 8 is a diagram illustrating an example process for implementing routing path groups between emulated switches.

FIG. 8 is a diagram illustrating an example process 800 for implementing routing path groups between emulated switches. In some embodiments, process 800, or portions thereof, may be performed by or at test system 100, CTC 102, CM 108, NEPRA 110, one or more of NEPs 114-118, testing tools 214, and/or another node or module. In some embodiments, process 800 may include steps 802, 804, and 806.

In some embodiments, process 800 may occur in a test environment (e.g., test environment 400) comprising NEPs (e.g., NEPs 114-118), where the NEPs implement an emulated switching fabric (e.g., emulated switching fabric 300) comprising emulated switches (e.g., e-switches 302-314), wherein the NEPs may be connected via at least one physical cable (e.g., cables 324 and 326). In some embodiments, process 800 may occur during or concurrently with a test session implemented or facilitated by test system 100 or other entities.

Referring to process 800, in step 802, it may be determined, using a network test system controller (e.g., CTC 102), at least one routing path group for communications between emulated switches (e.g., PODSW 310 and SPSW 314), where each of the at least one routing path group includes or uses virtual links utilizing one or more lanes of at least one physical cable (e.g., cable 324 connecting NEPs 114 and 118).

In some embodiments, at least one routing path group (e.g., implemented by test system 100 during a test session) may include a first routing path group and a second routing path group, wherein the first routing path group may be associated with a first group of lanes of at least one physical cable (e.g., connecting two of NEPs 114-118) and the second routing path group may be associated with a second group of lanes of the at least one physical cable.

In some embodiments, a routing path group may include a load balancing group, an ECMP group, a weighted ECMP group, a LAG, or a multi-path routing group. For example, CTC 102 may configure test environment 400 such that test related traffic can be load balanced among virtual links that connect emulated elements provided by multiple or different NEPs (e.g., NEPs 114-118). In this example, traffic may be load balanced based on various distribution techniques, e.g., round-robin, random, spray mode, etc.

In step 804, physical ports (e.g., front-panel or back-panel ports or related network cards) of the NEPs (e.g., NEPs 114-118) may be configured, using the network test system controller (e.g., CTC 102), to assign traffic during a test session to one of the virtual links (or logical ports) based on a routing path group identifier (e.g., a hash value, a routing key, a header parameter value, etc.) associated with the traffic.

In some embodiments, configuring physical ports may include implementing logical ports associated with one or more of the virtual links. For example, NEPs 114-118 or a port virtualizer therein may virtualize a physical port into independent logical ports that utilize virtual links supported by a single physical cable.

In some embodiments, each virtual link associated with at least one physical cable utilizes one or more distinct lanes of the at least one physical cable. For example, where a physical cable may include eight distinct physical-layer lanes, a first virtual link may utilize a first distinct lane, a second virtual link may utilize a second distinct lane, a third virtual link may utilize a third distinct lane, and so on and so forth. In another example, where a physical cable may include eight distinct physical-layer lanes, a first virtual link may utilize a first distinct lane and a second distinct lane, a second virtual link may utilize a third distinct lane and a fourth distinct lane, a third virtual link may utilize a fifth distinct lane and a sixth distinct lane, and a fourth virtual link may utilize a seven distinct lane and a eighth distinct lane.

In some embodiments, each virtual link associated with at least one physical cable may utilize a portion of the capacity of the at least one physical cable. For example, each virtual link may utilize one or more distinct physical-layer lanes of a physical cable, where the capacity of the physical cable may be the summation of capacity for all of the distinct physical-layer lanes of the physical cable, e.g., a 200G cable may have four lanes of 50G or a 200G cable may have eight lanes of 25G.

In some embodiments, at least one physical cable (e.g., connecting two or more NEPs 114-118) is a breakout or fanout cable, wherein the breakout or fanout cable connects a first NEP of the NEPs to two or more of the NEPs. For example, a 400G breakout cable connected to a physical port of NEP 118 may have one opposite-end connector connected to a physical port of NEP 114 and have another opposite-end connector connected to a physical port of NEP 116.

In this example, the physical connection between NEP 118 and NEP 114 may utilize two or more lanes of the breakout cable and the physical connection between NEP 118 and NEP 116 may utilize two or more different lanes of the breakout cable.

In step 806, the test session involving the test environment (e.g., test environment 400) may be initiated using the network test system controller (e.g., CTC 102).

In some embodiments, each NEP (e.g., NEPs 114-118) may comprise a switch processor, a switching ASIC or a programmable or fixed-function switching chip.

It will be appreciated that process 800 is for illustrative purposes and that different and/or additional actions may be used. It will also be appreciated that various actions described herein may occur in a different order or sequence.

It should be noted that test system 100, CTC 102, CM 108, NEPRA 110, NEPs 114-118, and/or functionality described herein may constitute one or more special purpose computing devices. Further, test system 100, CTC 102, CM 108, NEPRA 110, NEPs 114-118, and/or functionality described herein can improve the technological field of testing networks and related nodes by providing mechanisms, systems, methods, and/or techniques for implementing routing path groups between emulated switches.

It will be understood that various details of the subject matter described herein may be changed without departing from the scope of the subject matter described herein.

Furthermore, the foregoing description is for the purpose of illustration only, and not for the purpose of limitation, as the subject matter described herein is defined by the claims as set forth hereinafter.

What is claimed is:

1. A method for implementing routing path groups between emulated switches, the method comprising:
   in a test environment comprising network emulation platforms (NEPs), wherein the NEPs implement an emulated switching fabric comprising emulated switches, wherein the NEPs are connected via a physical cable comprising a finite number of distinct physical layer lanes having distinct bandwidths:
      determining, using a network test system controller, at least one routing path group for communications between the emulated switches, wherein each of the at least one routing path group includes or uses virtual links utilizing one or more physical layer lanes of the physical cable, wherein the at least one routing path group includes a first routing path group and a second routing path group, a first virtual link associated with the first routing path group utilizes one or more physical layer lanes of the physical cable and wherein a second virtual link associated with the second routing path group utilizes one or more physical layer lanes of the physical cable, and the one or more physical layer lanes utilized by the first virtual link are different from the one or more physical layer lanes utilized by the second virtual link;
      configuring, using the network test system controller, physical ports of the NEPs to assign traffic during a test session to one of the virtual links based on a routing path group identifier associated with the traffic; and
      initiating, using the network test system controller, the test session involving the test environment.

2. The method of claim 1 wherein configuring the physical ports includes implementing logical ports associated with one or more of the virtual links.

3. The method of claim 1 wherein each of the virtual links utilizes a distinct physical layer lane of the physical cable.

4. The method of claim 1 wherein each of the virtual links utilizes a portion of a capacity of the physical cable.

5. The method of claim 1 wherein the physical cable is a breakout or fanout cable, wherein the breakout or fanout cable connects a first NEP of the NEPs to two or more of the NEPs.

6. The method of claim 5 wherein a connection between the first NEP and a second NEP of the NEPs utilizes two or more physical layer lanes of the breakout cable and a connection between the first NEP and a third NEP of the NEPs utilizes two or more different physical layer lanes of the breakout cable.

7. The method of claim 1 wherein each of the at least one routing path group includes a load balancing group, an equal-cost multipath (ECMP) group, a weighted ECMP group, a link aggregate group (LAG), or a multi-path routing group.

8. The method of claim 1 wherein each of the NEPs comprises a switch processor, a switching application-specific integrated circuit (ASIC) or a programmable or fixed-function switching chip.

9. A system for implementing routing path groups between emulated switches, the system comprising:
   a test environment comprising network emulation platforms (NEPs), wherein the NEPs implement an emulated switching fabric comprising emulated switches, wherein the NEPs are connected via a physical cable comprising a finite number of distinct physical layer lanes having distinct bandwidths; and a network test system controller configured for:

determining at least one routing path group for communications between the emulated switches, wherein each of the at least one routing path group includes or uses virtual links utilizing one or more physical layer lanes of the physical cable, wherein the at least one routing path group includes a first routing path group and a second routing path group, a first virtual link associated with the first routing path group utilizes one or more physical layer lanes of the physical cable and wherein a second virtual link associated with the second routing path group utilizes one or more physical layer lanes of the physical cable, and the one or more physical layer lanes utilized by the first virtual link are different from the one or more physical layer lanes utilized by the second virtual link;

configuring physical ports of the NEPs to assign traffic during a test session to one of the virtual links based on a routing path group identifier associated with the traffic; and initiating the test session involving the test environment.

10. The system of claim 9 wherein the physical ports are configured for implementing logical ports associated with one or more of the virtual links.

11. The system of claim 9 wherein each of the virtual links utilizes a portion of a capacity of the physical cable.

12. The system of claim 9 wherein the physical cable is a breakout or fanout cable, wherein the breakout or fanout cable connects a first NEP of the NEPs to two or more of the NEPs.

13. The system of claim 12 wherein a connection between the first NEP and a second NEP of the NEPs utilizes two or more physical layer lanes of the breakout cable and a connection between the first NEP and a third NEP of the NEPs utilizes two or more different physical layer lanes of the breakout cable.

14. The system of claim 9 wherein each of the at least one routing path group includes a load balancing group, an equal-cost multipath (ECMP) group, a weighted ECMP group, a link aggregate group (LAG), or a multi-path routing group.

15. The system of claim 9 wherein each of the NEPs comprises a switch processor, a switching application-specific integrated circuit (ASIC) or a programmable or fixed-function switching chip.

16. A non-transitory computer readable medium having stored thereon executable instructions embodied in the non-transitory computer readable medium that when executed by at least one processor of a computing device cause the computing device to perform steps comprising:

in a test environment comprising network emulation platforms (NEPs), wherein the NEPs implement an emulated switching fabric comprising emulated switches, wherein the NEPs are connected via a physical cable comprising a finite number of distinct physical layer lanes having distinct bandwidths:

determining, using a network test system controller, at least one routing path group for communications between the emulated switches, wherein each of the at least one routing path group includes or uses virtual links utilizing one or more physical layer lanes of the physical cable, wherein the at least one routing path group includes a first routing path group and a second routing path group, a first virtual link associated with the first routing path group utilizes one or more physical layer lanes of the physical cable and wherein a second virtual link associated with the second routing path group utilizes one or more physical layer lanes of the physical cable, and the one or more physical layer lanes utilized by the first virtual link are different from the one or more physical layer lanes utilized by the second virtual link;

configuring, using the network test system controller, physical ports of the NEPs to assign traffic during a test session to one of the virtual links based on a routing path group identifier associated with the traffic; and initiating, using the network test system controller, the test session involving the test environment.

17. The non-transitory computer readable medium of claim 16 wherein configuring the physical ports includes implementing logical ports associated with one or more of the virtual links.

* * * * *

UNITED STATES PATENT AND TRADEMARK OFFICE
CERTIFICATE OF CORRECTION

PATENT NO. : 12,101,252 B2  
APPLICATION NO. : 17/896057  
DATED : September 24, 2024  
INVENTOR(S) : Stan et al.

Page 1 of 1

It is certified that error appears in the above-identified patent and that said Letters Patent is hereby corrected as shown below:

In the Claims

Column 28, Line 16:  
Replace "laver"  
With --"layer"--

Signed and Sealed this  
Twenty-sixth Day of November, 2024

Katherine Kelly Vidal  
*Director of the United States Patent and Trademark Office*